US012779606B2

(12) United States Patent
Katagiri

(10) Patent No.: US 12,779,606 B2
(45) Date of Patent: Nov. 3, 2026

(54) CONTROL DEVICE AND MACHINE SYSTEM

(71) Applicant: FANUC CORPORATION, Yamanashi (JP)

(72) Inventor: Taiki Katagiri, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 364 days.

(21) Appl. No.: 18/565,521

(22) PCT Filed: Jun. 28, 2021

(86) PCT No.: PCT/JP2021/024366

§ 371 (c)(1),
(2) Date: Nov. 30, 2023

(87) PCT Pub. No.: WO2023/275935

PCT Pub. Date: Jan. 5, 2023

(65) Prior Publication Data

US 2024/0375229 A1 Nov. 14, 2024

(51) Int. Cl.
*B23Q 7/04* (2006.01)
*B23Q 7/00* (2006.01)

(52) U.S. Cl.
CPC ............... *B23Q 7/04* (2013.01); *B23Q 7/003* (2013.01)

(58) Field of Classification Search
CPC .................................. B23Q 7/04; B23Q 7/003
See application file for complete search history.

(56) References Cited

U.S. PATENT DOCUMENTS 5,040,056 A * 8/1991 Sager ...................... B25J 9/0093 901/8
2010/0094453 A1* 4/2010 Nishihara .............. B25J 9/0093 700/230
2011/0224821 A1* 9/2011 Fortman .............. B65G 47/682 901/30
2015/0151430 A1* 6/2015 Koyanagi .............. B25J 9/0093 901/7
2020/0156236 A1* 5/2020 Lager ....................... B25J 9/163

FOREIGN PATENT DOCUMENTS

JP 2015-039768 A 3/2015
JP 2016-060002 A 4/2016
JP 2019217103 A 12/2019
JP 2020-505294 A 2/2020
JP 2021057014 A 4/2021

* cited by examiner

*Primary Examiner* — Kyle O Logan
(74) *Attorney, Agent, or Firm* — HAUPTMAN HAM, LLP

(57) ABSTRACT

This control device is provided with: a determination unit which determines whether or not to allow workpieces being conveyed to be retrieved or whether or not to allow workpieces to be delivered to workpiece containers being conveyed; and a control unit which generates, on the basis of whether or not the retrieval is allowed, a command to collectively retrieve a specified number of workpieces, or generates, on the basis of whether or not the delivery is allowed, a command to collectively deliver a specified number of workpieces, and thereby controls a machine.

13 Claims, 15 Drawing Sheets

CONTROL DEVICE AND MACHINE SYSTEM

RELATED APPLICATIONS

The present application is a National Phase of International Application No. PCT/JP2021/024366 filed Jun. 28, 2021.

TECHNICAL FIELD

The present invention relates to the field of machine control, and more particularly to a controller and a mechanical system for controlling a machine that collectively picking up or collectively taking out a specified number of workpieces.

BACKGROUND ART

A mechanical system is known in which a machine such as a robot picks up a workpiece or takes out a workpiece to a tray while following the workpiece or the tray conveyed by a conveyance device such as a conveyor. In such pick-and-place work, the machine may collectively pick up or collectively take out a plurality of workpieces. When a plurality of workpieces are picked up or taken out, a specified number of workpieces may not be picked up or taken out due to a workpiece or a tray being missing from a row of conveyed workpieces or a row of conveyed trays, conveyance information including a current position of a workpiece or a tray may be deleted due there being a defective workpiece or tray among the workpieces or trays being conveyed, or a status of a workpiece or a tray indicates that the workpiece or the tray cannot be picked up or taken out. Even in such a case, there is a demand for picking up or taking out the specified number of workpieces without omission.

In Patent Document 1, a robot system is described, which includes: a conveyor that conveys workpieces, a robot including a plurality of holding parts that hold a workpiece, and a controller that causes the robot to perform an operation of holding a workpiece by the holding part and transferring the workpiece to a predetermined place, and collectively transfers a plurality of workpieces to another conveyor at a time.

In Patent Document 2, a packing device is described, which includes a product supply conveyor that supplies a product, a box conveyor that conveys a box, and an articulated robot that supplies the product to the box, where the packing device picks up a plurality of products supplied by the product supply conveyor, narrows intervals between the products and supplies the products to an empty box conveyed by the box conveyor.

CITATION LIST

Patent Literature

PTL 1: Japanese Unexamined Patent Publication No. 2016-60002A

PTL 2: Japanese Unexamined Patent Publication No. 2015-39768A

SUMMARY OF INVENTION

Technical Problem

In view of problems in the prior art, an object of the present invention is to provide a technique capable of picking up or taking out a specified number of workpieces without omission.

Solution to Problem

According to an aspect of the present disclosure, there is provided a controller including a decision unit configured to determine whether or not a workpiece being conveyed is picked up or is taken out to a workpiece container being conveyed; and a control unit configured to control a machine by generating a command for collectively picking up a specified number of workpieces based on the determination as to whether or not the workpiece is picked up or generating a command for collectively taking out a specified number of workpieces based on the determination as to whether or not the workpiece is taken out.

According to another aspect of the present disclosure, there is provided a mechanical system including a plurality of machines, a decision unit configured to determine for each of the plurality of machines whether or not a workpiece being conveyed is picked up or is taken out to a workpiece container being conveyed; and a control unit configured to control the plurality of machines by generating, for each of the plurality of machines, a command for collectively picking up a specified number of workpieces based on the determination as to whether or not the workpiece is picked up or generating, for each of the plurality of machines, a command for collectively taking out the specified number of workpieces based on the determination as to whether or not the workpiece is taken out.

Advantageous Effect of Invention

According to one aspect of the present disclosure, there is provided a technique that enables picking up or taking out a specified number of workpieces without omission by generating a command for collectively picking up the specified number of workpieces or a command for collectively taking out the specified number of workpieces, based on whether or not the workpiece being conveyed is picked up or is taken out to a workpiece container being conveyed.

DESCRIPTION OF EMBODIMENTS

Figure 1:
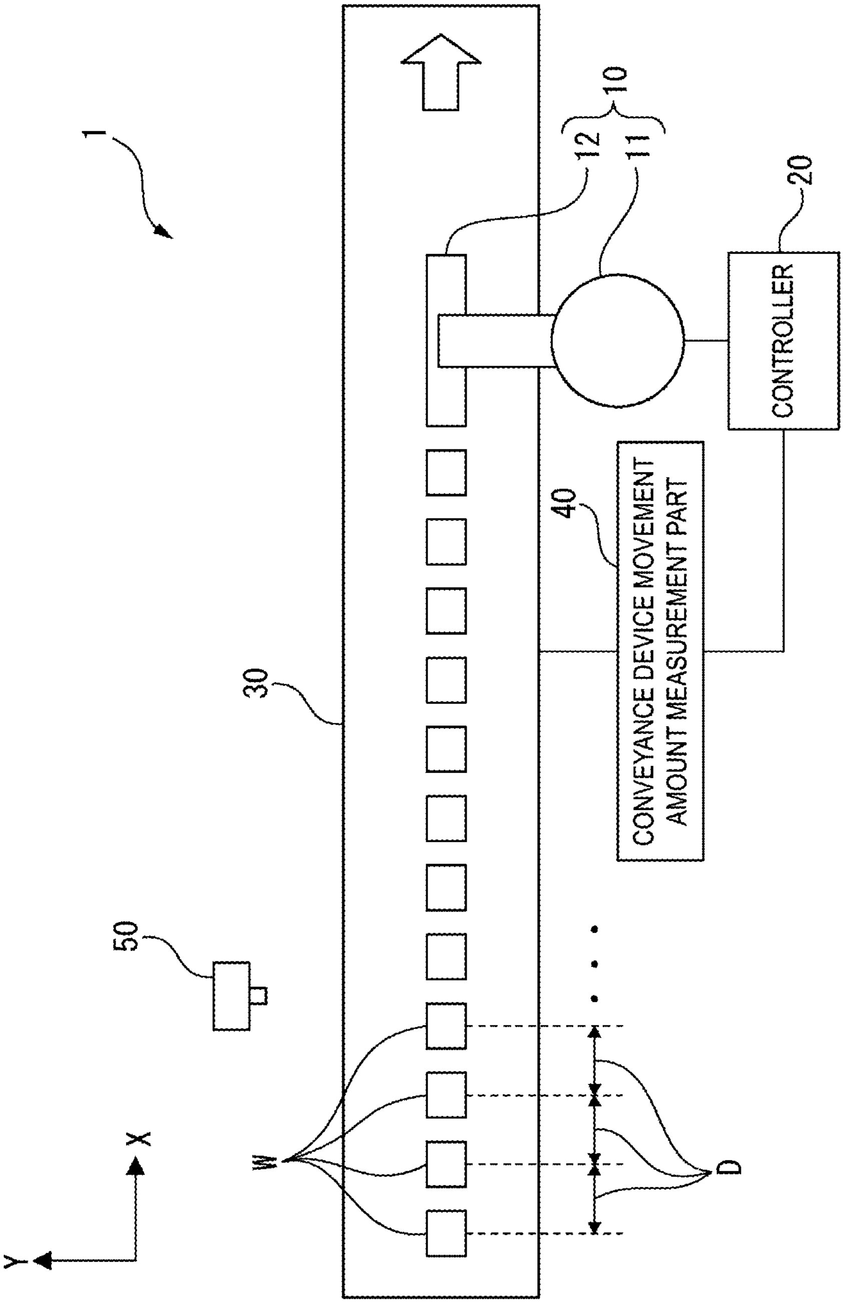
FIG. 1 is a configuration diagram of a mechanical system according to a first embodiment.

Embodiments of the present disclosure will be described in detail below with reference to the accompanying drawings. In the drawings, identical or similar constituent elements are given identical or similar reference signs. Additionally, the embodiments to be described below are not intended to limit the technical scope of the invention or the meaning of terms set forth in the claims.

FIG. 1 is a configuration diagram of a mechanical system 1 according to a first embodiment. The mechanical system 1 according to the first embodiment determines whether or not a workpiece W being conveyed is picked up, and collectively picks up a specified number of workpieces W based on the determination whether or not the workpiece W is picked up. The mechanical system 1 determines whether or not the workpiece W is picked up, based on a status or a current position included in conveyance information of the workpiece W. In addition, the mechanical system 1 collectively picks up the specified number of workpieces W based on the conveyance information of the workpiece W located upstream of the workpiece W determined not to picked up.

The mechanical system 1 includes a machine 10 that collectively takes out a specified number of workpieces W, and a controller 20 that controls the machine 10. In addition, the mechanical system 1 may include a conveyance device movement amount measurement part 40 that measures a movement amount of the conveyance device 30 in order to obtain a current position of the workpiece W being conveyed. The movement amount of the conveyance device 30 includes a current position, a current speed, and the like of the conveyance device 30. The mechanical system 1 may include a vision sensor 50 instead of the conveyance device movement amount measurement part 40 or in addition to the conveyance device movement amount measurement part 40 in order to obtain not only the current position, the current speed, and the like of the workpiece W being conveyed but also the current orientation, type, status, and the like of the workpiece W being conveyed.

The workpiece W is supplied to the conveyance device 30 upstream in the conveying direction X, is conveyed in the conveying direction X by the conveyance device 30, and is picked up by the machine 10 downstream in the conveying direction X. Although the workpieces W are supplied to the conveyance device 30 at substantially constant conveyance intervals D, the workpieces W may not necessarily be conveyed at exactly constant conveyance intervals D. Furthermore, the workpieces W are conveyed in a single row, but may be conveyed in a plurality of rows, such as two rows or three rows, as described in embodiments described later. For example, the workpiece W has a rectangular parallelepiped shape, but in other embodiments, the workpiece W may be a workpiece having other shapes such as a bag-like shape or a column shape. The conveyance device 30 may convey one type of workpiece W having the same shape and the same size, or may convey a plurality of types of workpieces W having different shapes and different sizes. The machine 10 collectively picks up one type or a plurality of types of workpieces W.

The machine 10 collectively picks up a specified number of workpieces W from among a plurality of workpieces W conveyed by the conveyance device 30. Although not illustrated, the machine 10 includes a motor that drives a movable part and a motor driving device that drives the motor, where the motor driving device is controlled by the controller 20. The machine 10 is connected to the controller 20 in a wired or wireless manner. For example, the machine 10 includes a robot 11 and a hand 12 attached to the robot 11. The robot 11 and the hand 12 are controlled by the single controller 20, but in other embodiments, they may be controlled by separate controllers independent of each other. In other embodiments, the machine 10 may be a different type of machine capable of collectively picking up a specified number of workpieces W, instead of the robot 11 and the hand 12.

The robot 11 moves the hand 12 to the workpiece pick-up position. The workpiece pick-up position is the center position of a workpiece W group obtained by averaging the current positions of a specified number of workpieces W, but may be the current position of the workpiece W supplied first among the specified number of workpieces W, the current position of the workpiece W supplied last among the specified number of workpieces W, or the like. Although not illustrated, the robot 11 includes a plurality of relatively movable links, a motor that drives the links, and a motor driving device that drives the motor, where the motor driving device is controlled by the controller 20. For example, the robot 11 is an industrial robot including a vertical articulated robot, a horizontal articulated robot, an orthogonal robot, a parallel link robot, a cooperative robot, and the like. In other embodiments, the robot 11 may be a different type of robot such as a humanoid.

The hand 12 collectively picks up a specified number of workpieces W at the workpiece pick-up position. Although not illustrated, the hand 12 includes a motor that drives a movable part and a motor driving device that drives the motor, where the motor driving device is controlled by the controller 20. The hand 12 is, for example, a vacuum suction type hand. In other embodiments, the hand 12 may be a different type of hand such as a multi-fingered gripping type, a magnetic attraction type, a vacuum suction type, or a Bernoulli type (non-contact type).

The controller 20 controls the machine 10 based on the conveyance information of the workpiece W. The controller 20 generates one piece of conveyance information for one workpiece W, but may generate one piece of conveyance information for a specified number of workpieces W. The conveyance information of the workpiece W includes a current position, a current speed, a current orientation, a type, a status, and the like of the workpiece W. The controller 20 updates the current position, the current speed, and the like of the workpiece W based on the movement amount of the conveyance device 30 acquired from the conveyance device movement amount measurement part 40. In other embodiments, the controller 20 may update the current orientation, the type, the status, and the like of the workpiece W in addition to the current position, the current speed, and the like of the workpiece W based on the visual information acquired from the vision sensor 50. In addition, the controller 20 updates the status indicating whether or not the workpiece W can be picked up, based on the work performance of the machine 10 or the type of workpiece W that can be picked up by the machine 10.

The controller 20 determines whether or not the workpiece W can be picked up based on the status or the current position included in the conveyance information of the workpiece W. The controller 20 determines that the workpiece W can picked up when the status included in the conveyance information of the workpiece W indicates that the workpiece W can be picked up, and determines that the workpiece W cannot be picked up when the status included in the conveyance information of the workpiece W indicates that the workpiece W cannot be picked up. In other words, the controller 20 determines whether or not the workpiece W can be picked up in response to the work performance of the machine 10 or the type of workpiece W that can be picked up by the machine 10.

Furthermore, the controller 20 determines that the workpiece W can be picked up, when the distance between the current positions included in the conveyance information of the workpieces W is within the threshold value, and determines that the workpiece W cannot be picked up, when the distance between the current positions included in the conveyance information of the workpieces W is not within the threshold value. In other words, the controller 20 determines that the workpiece W cannot be picked up, when the conveyance information of the workpiece W is deleted because the workpiece W is defective or when the workpiece W is missing from a row of workpieces W being conveyed.

The controller 20 controls the machine 10 by generating a command for collectively picking up a specified number of workpieces W, based on the conveyance information of the workpiece W located upstream of the workpiece W determined not to be picked up. The command for collectively picking up the specified number of workpieces W includes a movement command for moving to the workpiece pick-up position and a pick-up command for picking up the specified number of workpieces W. The machine 10 collectively picks up a specified number of workpieces W in response to a command from the controller 20. The controller 20 is communicably connected to the machine 10, the conveyance device movement amount measurement part 40, the vision sensor 50, and the like in a wired or wireless manner.

The controller 20 is a computer device (not illustrated) including a processor, a memory, an input/output part, and the like. The processor includes a semiconductor integrated circuit that executes a program, for example, a central processing unit (CPU), a micro processing unit (MPU), or the like. However, in other embodiments, the processor includes a programmable semiconductor integrated circuit, for example, a programmable logic device (PLD) such as a field programmable gate array (FPGA), or a non-programmable semiconductor integrated circuit, for example, an application specific integrated circuit (ASIC). The memory includes a semiconductor storage device that stores various data, for example, a random access memory (RAM), a read only memory (ROM), or the like. In other embodiments, the memory may include a magnetic storage device, such as an HDD, for storing various data.

The conveyance device 30 conveys one or more workpieces W. For example, the conveyance device 30 is a conveyor, but may be a different type of conveyance device such as a conveyance robot or an automated guided vehicle (AGV) in other embodiments. Although not illustrated, the conveyance device 30 includes a motor that drives a movable part and a motor driving device that drives the motor, and the motor driving device is controlled by an independent and separate controller different from the controller 20. In other embodiments, the motor driving device of the conveyance device 30 may be controlled by the controller 20 of the machine 10.

The conveyance device movement amount measurement part 40 measures the movement amount of the conveyance device 30. The movement amount of the conveyance device 30 includes a current position, a current speed, and the like of a motor that drives the conveyance device 30. For example, the conveyance device movement amount measurement part 40 is an encoder (e.g., a pulse coder). In other embodiments, the mechanical system 1 may include a different type of sensor such as the vision sensor 50 instead of the conveyance device movement amount measurement part 40 or in addition to the conveyance device movement amount measurement part 40. When the vision sensor 50 is used, the controller 20 may acquire not only the current position, the current speed, and the like of the workpiece W but also the current orientation, the type, the status, and the like of the workpiece W, based on the visual information acquired from the vision sensor 50.

Figure 2:
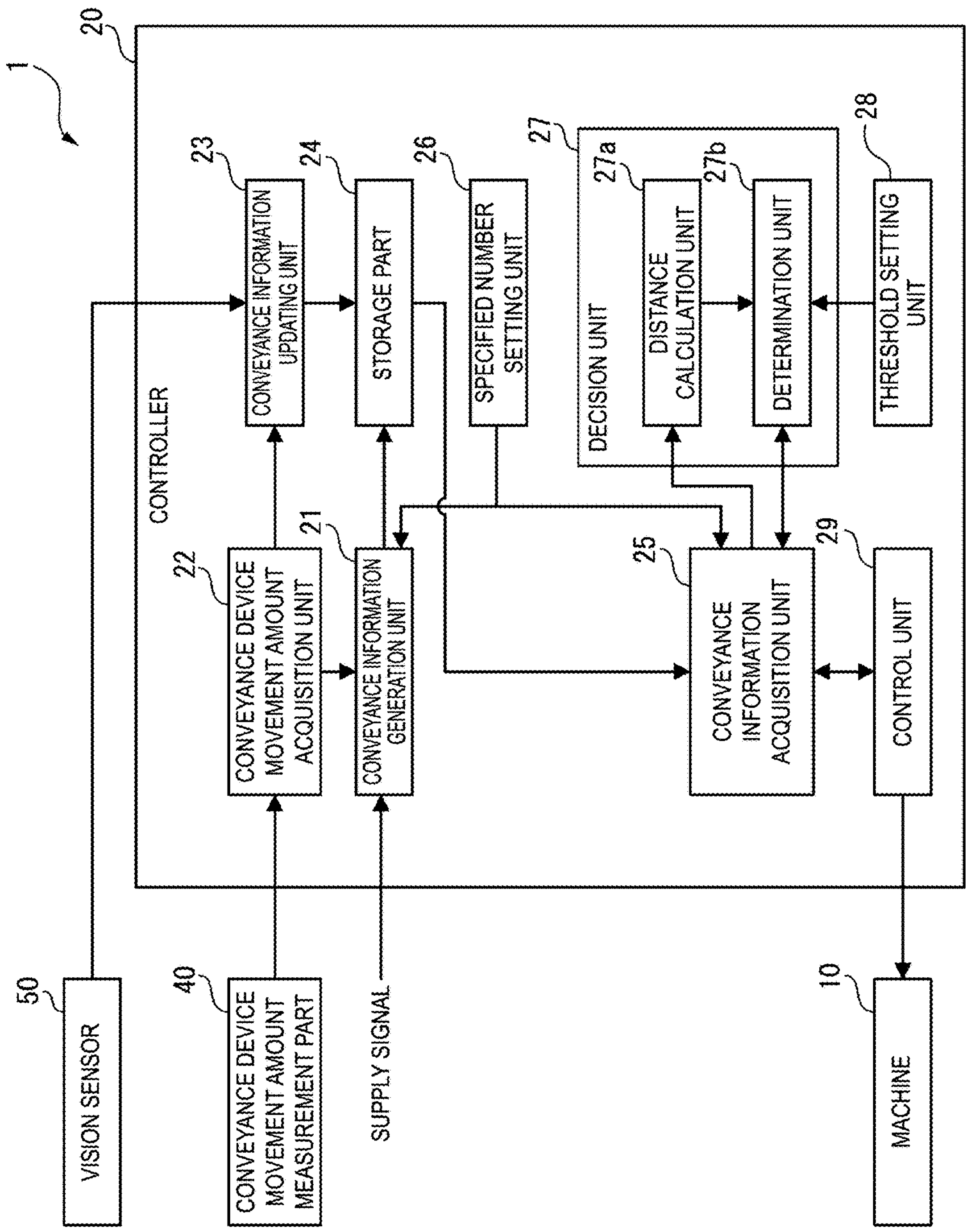
FIG. 2 is a functional block diagram of the mechanical system according to the first embodiment.

FIG. 2 is a functional block diagram of the mechanical system 1 according to the first embodiment. The mechanical system 1 of the first embodiment is a stand-alone system including one machine 10 and one controller 20, and the controller 20 includes a conveyance information generation unit 21, a conveyance device movement amount acquisition unit 22, a conveyance information updating unit 23, a storage part 24, a specified number setting unit 26, a conveyance information acquisition unit 25, a decision unit 27, a threshold value setting unit 28, and a control unit 29. However, it should be noted that the controller 20 may include at least the decision unit 27 and the control unit 29, and other external devices may include constitute elements other than those. For example, as described in an embodiment (see FIG. 15) described later, when the mechanical system 1 is a server type system including a plurality of machines 10, a plurality of controllers 20, and one host computer device 60, the host computer device 60 may include the conveyance information generation unit 21, the conveyance device movement amount acquisition unit 22, the conveyance information updating unit 23, and the storage part 24, and the controller 20 may include the specified number setting unit 26, the conveyance information acquisition unit 25, the decision unit 27, the threshold value setting unit 28, and the control unit 29. It should be noted that the constituent element other than the storage part 24 are configured by a part of or all of the computer program. In other embodiments, all the constituent elements in the controller 20 may be configured by a part of or all of a semiconductor integrated circuit.

The conveyance information generation unit 21 generates one piece of conveyance information for one workpiece W or generates one piece of conveyance information for a specified number of workpieces W. The conveyance information generation unit 21 acquires the set specified number from the specified number setting unit 26. For example, every time one workpiece W is supplied to the conveyance device 30, the conveyance information generation unit 21 receives a supply signal of the workpiece W from an external device (not illustrated), and generates one piece of conveyance information for one supply signal or generates one piece of conveyance information for a specified number of supply signals.

The conveyance information generation unit 21 generates conveyance information in which initial values of a current position, a current speed, a current orientation, a type, a status, and the like of the workpiece W are set. The conveyance information generation unit 21 transmits the generated conveyance information to the storage part 24. In order to simplify subsequent processing, the conveyance information generation unit 21 may store the conveyance information in the storage part 24 in the order of conveyance of the workpieces W.

The conveyance device movement amount acquisition unit 22 acquires the movement amount of the conveyance device 30 from the conveyance device movement amount measurement part 40. The conveyance device movement amount acquisition unit 22 transmits the acquired movement amount of the conveyance device 30 to the conveyance information updating unit 23.

The conveyance information updating unit 23 updates the conveyance information of the workpiece W stored in the storage part 24 based on the movement amount of the conveyance device 30, but may update the conveyance information of the workpiece W stored in the storage part 24 based on the visual information acquired from the vision sensor 50. For example, the conveyance information updating unit 23 updates the current position, the current speed, and the like of the workpiece W stored in the storage part 24 based on the movement amount of the conveyance device 30, or updates the current position, the current speed, the current orientation, the type, the status, and the like of the workpiece W stored in the storage part 24 based on the visual information acquired from the vision sensor 50.

The storage part 24 stores the conveyance information of the workpiece W in the order of conveyance of the workpieces W. Although not illustrated, the storage part 24 is a memory that stores various types of data. The memory includes a semiconductor storage device such as a RAM and a ROM, a magnetic storage device such as an HDD, and the like.

The specified number setting unit 26 sets a specified number of workpieces W that is collectively picked up by the machine 10. The specified number setting unit 26 sets a specified number specified by a user via a user interface unit (not illustrated) such as a touch panel display or a keyboard. Since the range of the specified number of workpieces W that can be collectively picked up depends on the type of the machine 10 (that is, the hand 12), the specified number setting unit 26 may have an initial value of the range of the specified number in response to the type of machine 10. The specified number setting unit 26 transmits the set specified number to the conveyance information generation unit 21 and the conveyance information acquisition unit 25.

The conveyance information acquisition unit 25 acquires the conveyance information of the workpiece W from the storage part 24. When one piece of conveyance information is generated for one workpiece W, the conveyance information acquisition unit 25 acquires the set specified number from the specified number setting unit 26, and sequentially acquires the specified number of pieces of conveyance information from the storage part 24 in the order of conveyance of the workpieces W. Alternatively, when one piece of conveyance information is generated for a specified number of workpieces W, the conveyance information acquisition unit 25 acquires one piece of conveyance information from the storage part 24 in the order of conveyance of the workpieces W. The conveyance information acquisition unit 25 transmits the conveyance information of the workpiece W to the decision unit 27 in the order of conveyance of the workpieces W in order to confirm whether or not the workpiece W is picked up.

The decision unit 27 determines whether or not the workpiece W is picked up based on the status or the current position included in the conveyance information of the workpiece W. The decision unit 27 includes a distance calculation unit 27*a* and a determination unit 27*b*. The determination unit 27*b* determines whether or not the status included in the conveyance information of the workpiece W indicates that the workpiece W can be picked up. The determination unit 27*b* determines that the workpiece W or the workpiece W group corresponding to the conveyance information can be picked up when the status included in the conveyance information of the workpiece W indicates that the workpiece can be picked up, and determines that the workpiece W or the workpiece W group cannot be picked up when the status included in the conveyance information indicates that the workpiece cannot be picked up.

In addition, the distance calculation unit 27*a* calculates the distance between the current positions included in the conveyance information of the adjacent workpieces W or workpiece W groups, and the determination unit 27*b* determines whether or not the calculated distance between the current positions is within the threshold value. When the calculated distance between the current positions is within the threshold value, the determination unit 27*b* determines that the adjacent workpieces W or workpiece W groups can be picked up, and when the calculated distance between the current positions is not within the threshold value, the determination unit determines that the workpiece W located downstream or the group of workpieces W cannot be picked up. The decision unit 27 transmits to the conveyance information acquisition unit 25 whether or not the workpiece W is picked up.

The threshold value setting unit 28 sets the threshold value of the distance between the current positions included in the conveyance information of the adjacent workpieces W or the adjacent groups of workpieces W. The threshold value setting unit 28 sets a threshold value specified by the user via a user interface unit (not illustrated) such as a touch panel display or a keyboard. Since the conveyance interval D of the workpiece W may not be constant, the threshold value setting unit 28 may set a range obtained by adding or subtracting an offset to or from the conveyance interval D of the workpiece W as the threshold value. When one piece of conveyance information is generated for the specified number of workpieces W, the threshold value setting unit 28 may set, as the threshold value, a range obtained by multiplying the specified number by the conveyance interval D of the workpieces W and adding or subtracting an offset to or from the multiplied value. The threshold value setting unit 28 transmits the set threshold value to the determination unit 27*b*.

In a case where one piece of conveyance information is generated for one workpiece W, when the decision unit 27 determines that the workpiece W or the workpiece W group can be picked up, the conveyance information acquisition unit 25 sequentially acquires the conveyance information from the storage part 24 until the specified number of pieces of the conveyance information is obtained, and when the decision unit 27 determines that the workpiece W or the workpiece W group cannot be picked up, the conveyance information acquisition unit 25 again acquires, from the storage part 24, the conveyance information of the specified number of workpieces W located upstream of the workpiece W or the workpiece W group determined not to be picked up. When the specified number of pieces of conveyance information can be acquired from the storage part 24, the conveyance information acquisition unit 25 transmits the specified number of pieces of conveyance information to the control unit 29.

Alternatively, in a case where one piece of conveyance information is generated for the specified number of workpieces W, when the decision unit 27 determines that the workpiece W group can be picked up, the conveyance information acquisition unit 25 transmits one piece of conveyance information to the control unit 29, and when the decision unit 27 determines that the workpiece W group cannot be picked up, the conveyance information acquisition unit 25 again acquires one piece of conveyance information from the storage part 24.

The control unit 29 calculates a workpiece pick-up position based on the current position included in the conveyance information, generates a command for collectively picking up a specified number of workpieces W based on the workpiece pick-up position, and transmits the generated command to the machine 10. When one piece of conveyance information is generated for one workpiece W, the control unit 29 calculates the workpiece pick-up position based on the current position of the workpiece W included in each of the specified number of pieces of conveyance information. In a case where one piece of conveyance information is generated for a specified number of workpieces W, the control unit 29 calculates the workpiece pick-up position based on the current position of the workpiece group included in the conveyance information. The workpiece pick-up position is a center position obtained by averaging the current positions of the specified number of workpieces W, but may be the current position of the workpiece W supplied first among the specified number of workpieces W, the current position of the workpiece W supplied last among the specified number of workpieces W, or the like. The control unit 29 continues to calculate the workpiece pick-up position until the machine 10 collectively picks up the specified number of workpieces W.

The control unit 29 determines whether or not the workpiece pick-up position has entered the work area of the machine 10. When the workpiece pick-up position enters the work area of the machine 10, the control unit 29 generates a command for collectively picking up the specified number of workpieces W, and transmits the command to the machine 10. The command for collectively picking up the specified number of workpieces W includes a movement command for moving to the workpiece pick-up position and a pick-up command for picking up the specified number of workpieces W. The control unit 29 continues to transmit, to the machine 10, the movement command for moving to the workpiece pick-up position until the machine 10 reaches the workpiece pick-up position, and transmits, to the machine 10, a command for picking up a specified number of workpieces W to the machine 10 when the machine 10 reaches the workpiece pick-up position.

The machine 10 tracks the specified number of workpieces W in response to the command from the controller 20 and collectively picks up the specified number of workpieces W when the machine 10 reaches the workpiece pick-up position. As will be described in an embodiment described later, after the specified number of workpieces W are collectively picked up, the machine 10 collectively takes out the specified number of workpieces W to a workpiece container. After the specified number of workpieces W are collectively taken out, the machine 10 repeats the above-described operation in order to collectively pick up the specified number of workpieces W.

Figure 3:
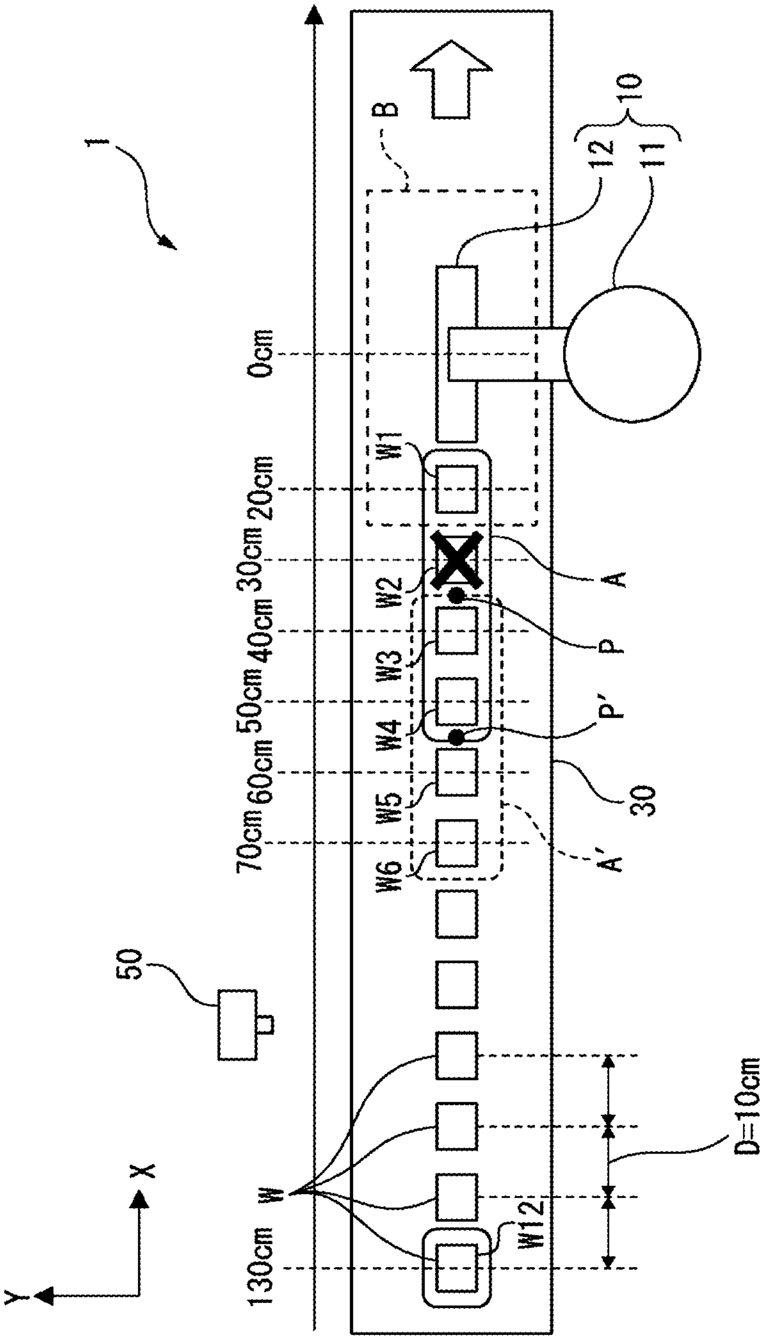
FIG. 3 is a diagram illustrating Example 1-1 of the mechanical system according to the first embodiment.

FIG. 3 is a diagram illustrating Example 1-1 of a mechanical system 1 according to the first embodiment. The example will be described also with reference to FIG. 2. The prerequisites for the example are as follows.

- One type or a plurality of types of workpieces W are conveyed in one row at the conveyance interval D=10 cm.
- The specified number setting unit 26 sets the specified number of workpieces W to be collectively picked up by the machine 10 to four.
- The machine 10 picks up the workpiece W in a work area B±25 cm at the X coordinate of the machine coordinate system.
- The hand 12 is configured to collectively pick up one to four workpieces W.
- The conveyance information generation unit 21 generates one piece of conveyance information (W1 to W12) for one workpiece W.
- The storage part 24 stores the conveyance information W1 to W12 in the order of conveyance of the workpieces W.
- The current positions of the workpieces W included in the conveyance information W1 to W12 are 20 cm, 30 cm, 40 cm, . . . , and 130 cm, respectively, in the X coordinate of the machine coordinate system.
- The threshold value setting unit 28 sets the threshold values of the distance between the current positions included in the conveyance information of the adjacent workpieces W to ±13 cm (=conveyance interval 10 cm±offset 3 cm).

The status of the workpiece W included in the conveyance information W2 indicates that the workpiece W cannot be picked up (indicated by an "x" mark), depending on the work performance of the machine 10 or the type of workpiece W that can be picked up by the machine 10.

The conveyance information acquisition unit 25 sequentially acquires the specified number of four pieces of conveyance information W1 to W4 from the storage part 24, and sequentially transmits the conveyance information to the decision unit 27. The sequentially determines whether or not the workpiece W is decision unit 27 picked up based on the status of the workpiece W included in each piece of conveyance information W1 to W4. Since the status of the workpiece W included in the conveyance information W1 indicates that the workpiece W can be picked up, the determination unit 27*b* determines that the workpiece W corresponding to the conveyance information W1 can be picked up. In addition, since the status of the workpiece W included in the conveyance information W2 indicates that the workpiece W cannot be picked up (indicated by an "x" mark), the determination unit 27*b* determines that the workpiece W corresponding to the conveyance information W2 cannot be picked up. The decision unit 27 transmits to the conveyance information acquisition unit 25 that the workpiece W corresponding to the conveyance information W2 cannot be picked up.

The conveyance information acquisition unit 25 again sequentially acquires, from the storage part 24, the conveyance information W3 to W6 of the specified number of four workpieces W located upstream of the workpiece W (indicated by an "x" mark) determined not to be picked up and sequentially transmits the conveyance information to the decision unit 27. The decision unit 27 determines whether or not the workpiece W is sequentially picked up, based on the status of the workpiece W included in the conveyance information W3 to W6. The determination unit 27*b* determines that all the workpieces W corresponding to the conveyance information W3 to W6 can be picked up since all the statuses included in the conveyance information W3 to W6 indicate that the workpieces W can be picked up. The decision unit 27 sequentially transmits to the conveyance information acquisition unit 25 that the workpieces W corresponding to the conveyance information W3 to W6 can be picked up. Since four pieces as the specified number of conveyance information W3 to W6 of the workpieces W determined to be picked up have been acquired from the storage part 24, the conveyance information acquisition unit 25 transmits the conveyance information W3 to W6 to the control unit 29.

The control unit 29 calculates the workpiece pick-up position P' (55 cm) based on the current positions (40 cm, 50 cm, 60 cm, and 70 cm) of the workpieces W included in the conveyance information W3 to W6. In other words, the original workpiece pick-up position P (35 cm) is corrected to the workpiece pick-up position P' (55 cm) based on the current position of the workpiece W included in each piece of conveyance information W3 to W6 of the workpiece W located upstream of the workpiece W (indicated by an "x" mark) determined not to be picked up. In other words, the original workpiece pick-up area A is corrected to the workpiece pick-up area A' by the specified number of four workpieces W located upstream of the workpiece W determined not to be picked up.

The control unit 29 continues to calculate the workpiece pick-up position P' based on the current position of the workpiece W included in each piece of conveyance information W3 to W6 until the specified number of four workpieces W are picked up. When the workpiece pick-up position P' enters the work area B (±25 cm) of the machine 10, the control unit 29 continues to transmit a movement command for moving to the workpiece pick-up position P' to the machine 10, and tracks the specified number of four workpieces W. When the machine 10 reaches the specified number of four workpieces W, the control unit 29 transmits, to the machine 10, a pick-up command for picking up the specified number of four workpieces W.

As described above, even when the status included in the conveyance information W2 indicates that the workpiece W cannot be picked up, the machine 10 picks up the specified number of four workpieces W located upstream of the workpiece W determined not to be picked up, and thus the specified number of four workpieces W can be picked up without omission. In addition, since the conveyance information generation unit 21 generates one piece of conveyance information (W1 to W12) for one workpiece W, the machine 10 can collectively pick up the specified number of four workpieces W from the workpiece W immediately after the workpiece W determined not to be picked up. In other words, the machine 10 can pick up, to the extent possible, the workpieces W that can be picked up.

Figure 4:
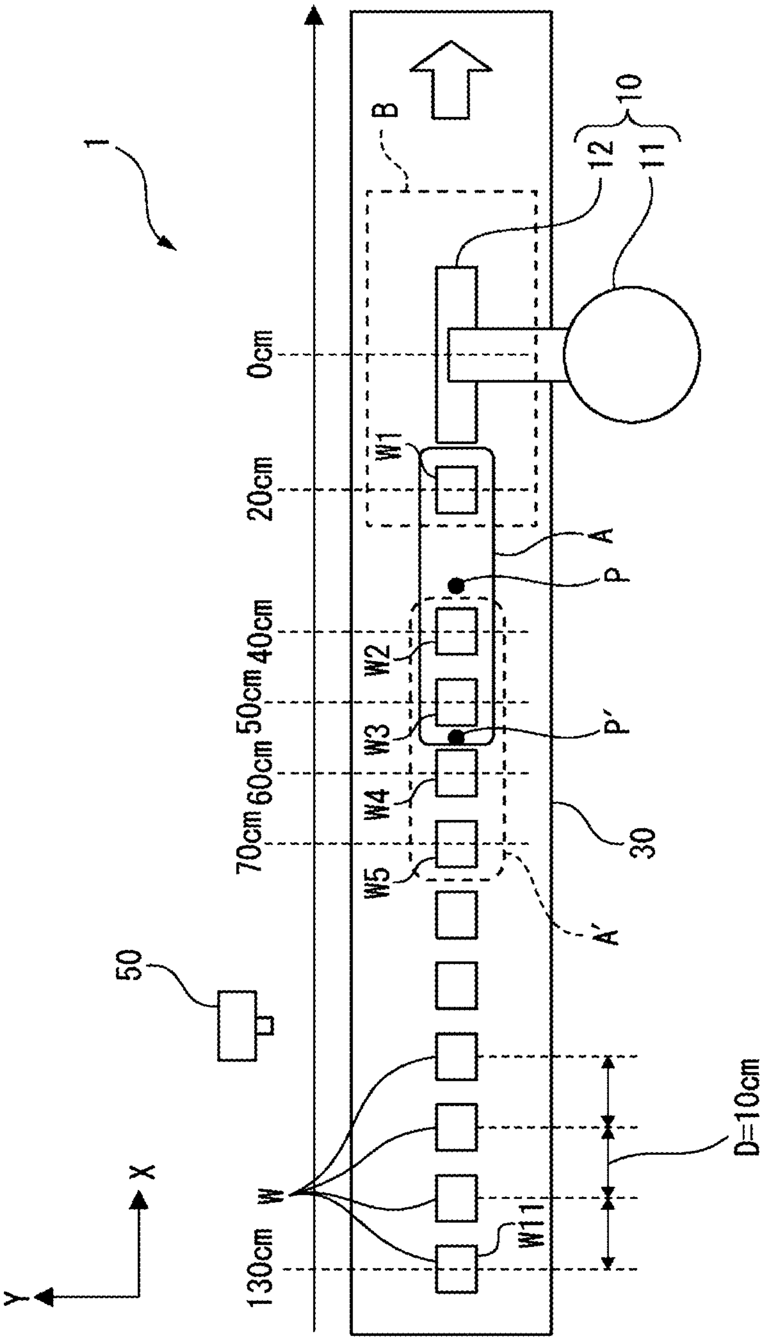
FIG. 4 is a diagram illustrating Example 1-2 of the mechanical system according to the first embodiment.

FIG. 4 is a diagram illustrating Example 1-2 of the mechanical system 1 according to the first embodiment. The example will be described also with reference to FIG. 2. The prerequisites for the example are as follows.

- One type or a plurality of types of workpieces W are conveyed in one row at the conveyance interval D=10 cm.
- The specified number setting unit 26 sets the specified number of workpieces W to be collectively picked up by the machine 10 to four.
- The machine 10 picks up the workpiece W in a work area B±25 cm at the X coordinate of the machine coordinate system.
- The hand 12 is configured to collectively pick up one to four workpieces W.
- The conveyance information generation unit 21 generates one piece of conveyance information (W1 to W11) for one workpiece W.
- The storage part 24 stores the conveyance information W1 to W11 in the order of conveyance of the workpieces W.
- The current positions of the workpieces W included in the conveyance information W1 to W11 are 20 cm, 40 cm, 50 cm, . . . , and 130 cm, respectively, in the X coordinate of the machine coordinate system.
- The threshold value setting unit 28 sets the threshold value of the distance between the current positions included in the conveyance information of the adjacent workpieces W to ±13 cm (=conveyance interval 10 cm±offset 3 cm).
- Between the workpiece W corresponding to the conveyance information W1 and the workpiece W corresponding to the conveyance information W2, the conveyance information is deleted because the workpiece W is a defective article, or the workpiece W is conveyed in a toothless state in which the workpiece W is missing from the row of workpieces W.

The conveyance information acquisition unit 25 sequentially acquires the conveyance information W1 to W4 of the specified number of four workpieces W from the storage part 24 and sequentially transmits the conveyance information to the decision unit 27. The decision unit 27 sequentially determines whether or not the workpiece W is picked up based on the distances between the current positions included in the conveyance information W1 and W2 of the adjacent workpieces W, the conveyance information W2 and W3 of the adjacent workpieces W, and the conveyance information W3 and W4 of the adjacent workpieces W. The distance calculation unit 27*a* calculates the distance (20 cm) between the current positions (20 cm and 40 cm) included in the conveyance information W1 and W2 of the adjacent workpieces W, and the determination unit 27*b* determines that the calculated distance (20 cm) between the current positions is not within the threshold value (±13 cm). The decision unit 27 determines that the workpiece W located downstream of the adjacent workpieces W cannot be picked up, and transmits, to the conveyance information acquisition unit 25, the determination that the workpiece W corresponding to the conveyance information W1 cannot be picked up.

The conveyance information acquisition unit 25 again sequentially acquires, from the storage part 24, the conveyance information W2 to W5 of the specified number of four workpieces W located upstream of the workpiece W determined not to be picked up, and sequentially transmits the conveyance information to the decision unit 27. The decision unit 27 sequentially determines whether or not the workpiece W can be picked up based on the distances between the current positions included in the conveyance information W2 and W3 of the adjacent workpieces W, the conveyance information W3 and W4 of the adjacent workpieces W, and the conveyance information W4 and W5 of the adjacent workpieces W. The distance calculation unit 27*a* sequentially calculates the distances (10 cm, 10 cm, and 10 cm) between the current positions included in the conveyance information W2 and W3 of the adjacent workpieces W, the conveyance information W3 and W4 of the adjacent workpieces W, and the conveyance information W4 and W5 of the adjacent workpieces W. The determination unit 27*b* sequentially determines whether or not the calculated distance (10 cm, 10 cm, and 10 cm) between the current positions is not within the threshold value (±13 cm), but since all the distances (10 cm, 10 cm, and 10 cm) are within the threshold value (±13 cm), the determination unit 27*b* determines that all the workpieces W corresponding to the conveyance information W2 to W5 can be picked up. The decision unit 27 sequentially transmits, to the conveyance information acquisition unit 25, the determination that the workpieces W corresponding to the conveyance information W2 to W5 can be picked up. Since the specified number of four pieces of conveyance information W2 to W5 have been acquired from the storage part 24, the conveyance information acquisition unit 25 transmits the conveyance information W2 to W5 to the control unit 29.

The control unit 29 calculates the workpiece pick-up position P' (55 cm) based on the current positions (40 cm, 50 cm, 60 cm, and 70 cm) of the workpieces W included in the conveyance information W2 to W5. In other words, the original workpiece pick-up position P (35 cm) is corrected to the workpiece pick-up position P' (55 cm) based on the current positions included in each piece of conveyance information W2 to W5 of the workpiece W located upstream of the workpiece W determined not to be picked up. Stated otherwise, the original workpiece pick-up area A is corrected to the workpiece pick-up area A' by the specified number of four workpieces W located upstream of the workpiece W determined not to be picked up.

The control unit 29 continues to calculate the workpiece pick-up position P' based on the current position of the workpiece W included in each piece of conveyance information W2 to W5 until the specified number of four workpieces W are picked up. When the workpiece pick-up position P' enters the work area B (±25 cm) of the machine 10, the control unit 29 continues to transmit, to the machine 10, a movement command for moving to the workpiece pick-up position P', and tracks the specified number of four workpieces W. When the machine 10 reaches the specified number of four workpieces W, the control unit 29 transmits, to the machine 10, a pick-up command for picking up the specified number of four workpieces W.

As described above, even when one piece of conveyance information is deleted because the workpiece W is defective, or even when the workpiece W is conveyed in a toothless state in which the workpiece W is missing from the row of workpieces W, the machine 10 picks up the specified number of four workpieces W located upstream of the workpiece W determined not to be picked up, and thus the specified number of four workpieces W can be picked up without omission. In addition, since the conveyance information generation unit 21 generates one piece of conveyance information for one workpiece W, the machine 10 can collectively pick up the specified number of four workpieces W from the workpiece W immediately after the workpiece W determined not to be picked up. In other words, the machine 10 can pick up, to the extent possible, the workpieces W that can be picked up.

Figure 5:
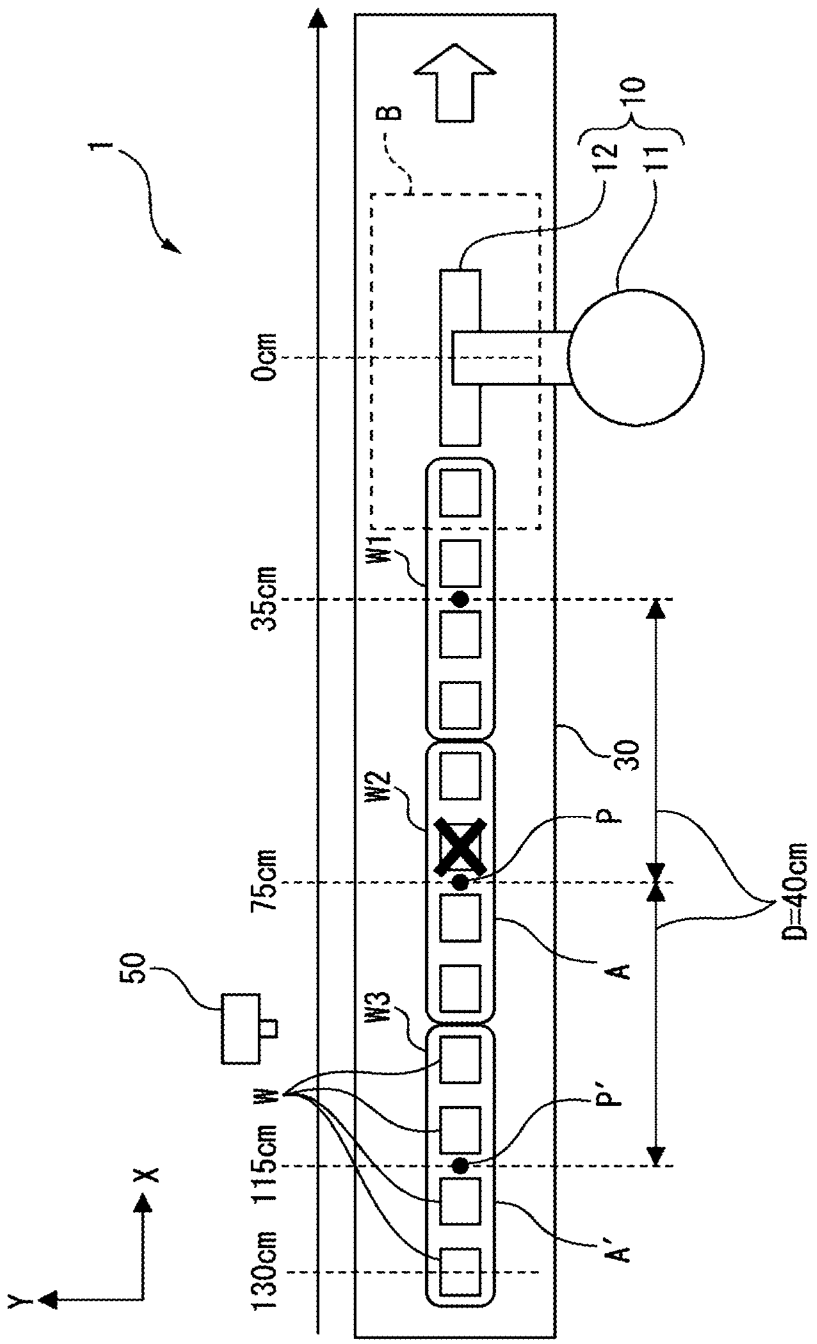
FIG. 5 is a diagram illustrating Example 1-3 of the mechanical system according to the first embodiment.

FIG. 5 is a diagram illustrating Example 1-3 of the mechanical system 1 according to the first embodiment. The example will be described also with reference to FIG. 2. The prerequisites for the example are as follows.

- One type or a plurality of types of workpieces W are conveyed in one row at the conveyance interval D=10 cm.
- The specified number setting unit 26 sets the specified number of workpieces W to be collectively picked up by the machine 10 to four.
- The machine 10 picks up the workpiece W in a work area B±25 cm at the X coordinate of the machine coordinate system.
- The hand 12 is configured to collectively pick up one to four workpieces W.
- The conveyance information generation unit 21 generates one piece of conveyance information (W1 to W3) of the workpiece W for the specified number of four workpieces W.
- The storage part 24 stores the conveyance information W1 to W3 in the order of conveyance of the workpieces W.
- The current positions of the workpieces W included in the conveyance information W1 to W3 are 35 cm, 75 cm, and 115 cm, respectively, in the X coordinate of the machine coordinate system.
- The threshold value setting unit 28 sets the threshold value of the distance between the current positions included in the conveyance information of the adjacent group of workpieces W to ±43 cm (=the specified number 4×the conveyance interval 10 cm±the offset 3 cm).
- The status of the workpiece W included in the conveyance information W2 indicates that the workpiece W cannot be picked up (indicated by an "x" mark), depending on the work performance of the machine 10 or the type of workpiece W that can be picked up by the machine 10.

When the machine 10 picks up the workpiece group corresponding to the conveyance information W2, the conveyance information acquisition unit 25 acquires one piece of conveyance information W2 from the storage part 24 and transmits the piece of conveyance information W2 to the decision unit 27. The decision unit 27 determines whether or not the workpiece W is picked up, based on the status of the workpiece W included in the conveyance information W2. Since the status of the workpiece W included in the conveyance information W2 indicates that the workpiece W cannot be picked up (indicated by an "x" mark), the determination unit 27*b* determines that the workpiece W group corresponding to the conveyance information W2 cannot be picked up. The decision unit 27 transmits, to the conveyance information acquisition unit 25, the determination that the workpiece W group corresponding to the conveyance information W2 cannot be picked up.

The conveyance information acquisition unit 25 again acquires, from the storage part 24, the conveyance information W3 of the workpiece W group located upstream of the workpiece W group determined not to be picked up, and transmits the conveyance information W3 to the decision unit 27. The decision unit 27 determines whether or not the workpiece W is picked up, based on the status of the workpiece W included in the conveyance information W3. Since the status included in the conveyance information W3 indicates that the workpiece W can be picked up, the determination unit 27*b* determines that all the workpieces W corresponding to the conveyance information W3 can be picked up. The decision unit 27 transmits, to the conveyance information acquisition unit 25, the determination that the workpiece W group corresponding to the conveyance information W3 can be picked up. Since the conveyance information W3 of the workpiece W group determined to be picked up can be acquired from the storage part 24, the conveyance information acquisition unit 25 transmits the conveyance information W3 to the control unit 29.

The control unit 29 calculates a workpiece pick-up position P' (115 cm) based on the current position (115 cm) of the workpiece W group included in the conveyance information W3. In other words, the original workpiece pick-up position P (75 cm) is corrected to the workpiece pick-up position P' (115 cm) based on the current position included in the conveyance information W3 of the workpiece W group located upstream of the workpiece W group determined not to be picked up. Stated otherwise, the original workpiece pick-up area A is corrected to the workpiece pick-up area A' by the specified number of four workpiece groups located upstream of the workpiece W group determined not to be picked up.

The control unit 29 continues to calculate the workpiece pick-up position P' based on the current position of the workpiece W included in the conveyance information W3 until the specified number of four workpieces W are picked up. When the workpiece pick-up position P' enters the work area B (±25 cm) of the machine 10, the control unit 29 continues to transmit a command for moving to the workpiece pick-up position P' to the machine 10, and tracks the specified number of four workpieces W. A command for collectively picking up is generated to control the machine 10. When the machine 10 reaches the specified number of four workpieces W, the control unit 29 transmits, to the machine 10, a pick-up command for picking up the specified number of four workpieces W.

As described above, even when the status included in the conveyance information W2 indicates that the workpiece W cannot be picked up, the machine 10 picks up the specified number of four workpieces W located upstream of the workpiece W determined not to be picked up, and thus the specified number of four workpieces W can be picked up without omission. However, since the conveyance information generation unit 21 generates one piece of conveyance information (W1 to W3) for the specified number of four workpieces W, the machine 10 does not pick up the workpiece W group corresponding to the conveyance information W2 at all even if some workpieces W in the workpiece W group determined not to be picked up can be picked up. In other words, it cannot be said that the machine 10 picks up, to the extent possible, the workpiece W that can be picked up.

Figure 6:
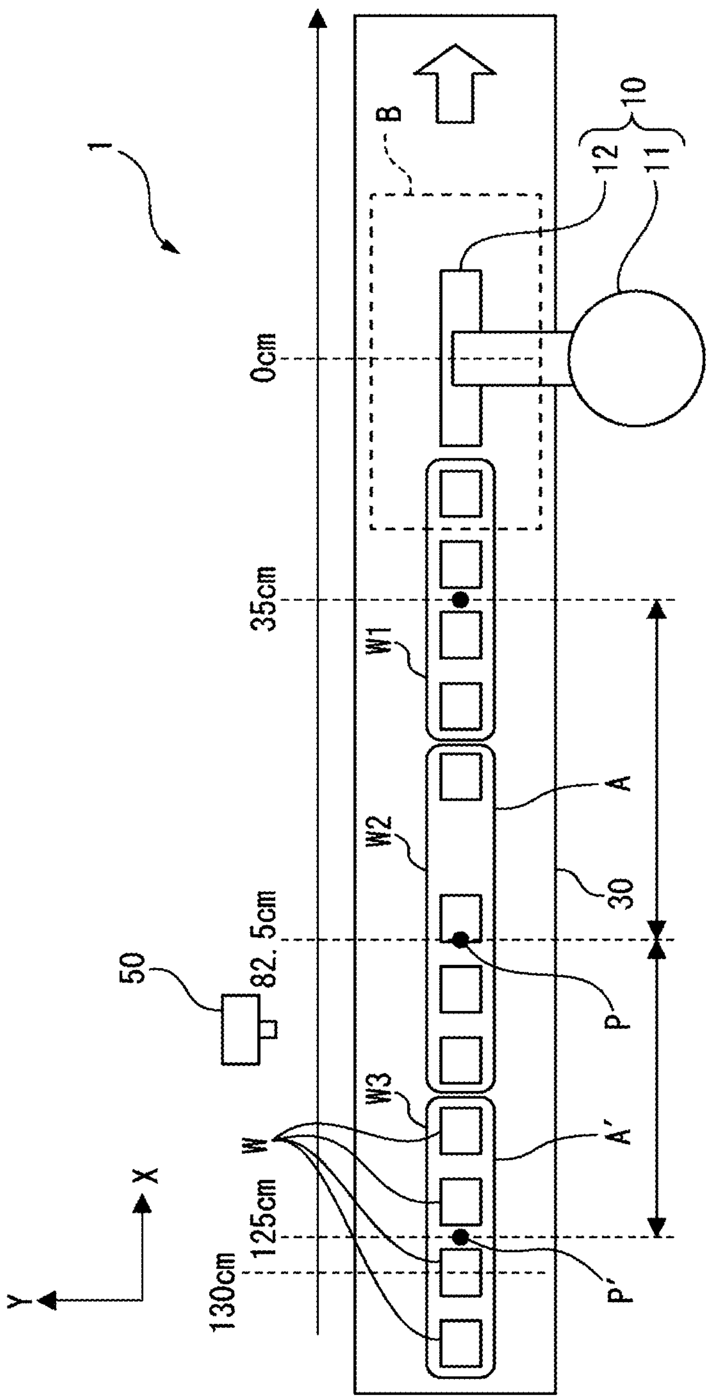
FIG. 6 is a diagram illustrating Example 1-4 of the mechanical system according to the first embodiment.

FIG. 6 is a diagram illustrating Example 1-4 of the mechanical system 1 according to the first embodiment. The example will be described also with reference to FIG. 2. The prerequisites for the example are as follows.

- One type or a plurality of types of workpieces W are conveyed in one row at the conveyance interval D=10 cm.
- The specified number setting unit 26 sets the specified number of workpieces W to be collectively picked up by the machine 10 to four.
- The machine 10 picks up the workpiece W in a work area B±25 cm at the X coordinate of the machine coordinate system.
- The hand 12 is configured to collectively pick up one to four workpieces W.
- The conveyance information generation unit 21 generates one piece of conveyance information (W1 to W3) for the specified number of four workpieces W.
- The storage part 24 stores the conveyance information W1 to W3 in the order of conveyance of the workpieces W.
- The current positions of the workpieces W included in the conveyance information W1 to W3 are 35 cm, 82.5 cm, and 125 cm, respectively, in the X coordinate of the machine coordinate system.
- The threshold value setting unit 28 sets the threshold value of the distance between the current positions included in the conveyance information of the adjacent group of workpieces W to ±43 cm (=the specified number 4× the conveyance interval 10 cm±the offset 3 cm).
- In the conveyance information W2, the workpiece W is conveyed in a toothless state in which the workpiece W is missing from the row of workpieces W.

When the machine 10 picks up the workpiece group corresponding to the conveyance information W2, the conveyance information acquisition unit 25 acquires one piece of conveyance information W2 from the storage part 24 and transmits the piece of conveyance information W2 to the decision unit 27. The decision unit 27 determines whether or not the workpiece W group is picked up based on the distance between the current positions included in the conveyance information W1 and W2 of the adjacent workpiece W groups. The distance calculation unit 27*a* calculates the distance (47.5 cm) between the current positions (35 cm and 82.5 cm) included in the conveyance information W1 and W2 of the adjacent workpiece W groups, and the determination unit 27*b* determines that the calculated distance (47.5 cm) between the current positions is not within the threshold value (±43 cm). The decision unit 27 determines that the workpiece W group on the upstream side among the adjacent workpiece W groups cannot be picked up, and transmits, to the conveyance information acquisition unit 25, the determination that the workpiece group corresponding to the conveyance information W2 cannot be picked up.

The conveyance information acquisition unit 25 again acquires, from the storage part 24, the conveyance information W3 of the workpiece W group located upstream of the workpiece W group determined not to be picked up, and transmits the conveyance information W3 to the decision unit 27. The decision unit 27 determines whether or not the workpiece W group is picked up, based on the distance between the current positions included in the conveyance information W2 and W3 of the adjacent workpiece W groups. The distance calculation unit 27*a* calculates the distance (42.5 cm) between the current positions (82.5 cm and 125 cm) included in the conveyance information W2 and W3 of the adjacent workpiece W groups, and the determination unit 27*b* determines that the calculated distance (42.5 cm) between the current positions is within the threshold value (±43 cm). The decision unit 27 determines that the workpiece W group corresponding to the conveyance information W3 can be picked up, and transmits the determination that the workpiece W group corresponding to the conveyance information W3 can be picked up to the conveyance information acquisition unit 25. Since one piece of conveyance information W3 can be acquired from the storage part 24, the conveyance information acquisition unit 25 transmits the conveyance information W3 to the control unit 29.

The control unit 29 calculates a workpiece pick-up position P' (125 cm) based on the current position (125 cm) of the workpiece W group included in the conveyance information W3. In other words, the original workpiece pick-up position P (82.5 cm) is corrected to the workpiece pick-up position P' (125 cm) based on the current position included in the conveyance information W3 of the workpiece W group located upstream of the workpiece W group determined not to be picked up. Stated otherwise, the original workpiece pick-up area A is corrected to the workpiece pick-up area A' by the workpiece W group located upstream of the workpiece W group determined not to be picked up.

The control unit 29 continues to calculate the workpiece pick-up position P' based on the current position of the workpiece W group included in the conveyance information W3 until the specified number of four workpieces W are picked up. When the workpiece pick-up position P' enters the work area B (±25 cm) of the machine 10, the control unit 29 continues to transmit, to the machine 10, a movement command for moving to the workpiece pick-up position P', and tracks the specified number of four workpieces W. When the machine 10 reaches the specified number of four workpieces W, the control unit 29 transmits, to the machine 10, a pick-up command for picking up the specified number of four workpieces W.

As described above, even when the workpiece W is conveyed in the toothless state in which the workpiece W is missing from the row of workpieces W, the machine 10 can pick up the specified number of four workpieces W located upstream of the workpiece W group determined not to be picked up, and thus can pick up the specified number of four workpieces W without omission. However, since the conveyance information generation unit 21 generates one piece of conveyance information (W1 to W3) for the specified number of four workpieces W, the machine 10 does not pick up the workpiece W group corresponding to the conveyance information W2 at all even if some workpieces W in the workpiece W group determined not to be picked up can be picked up. In other words, it cannot be said that the machine 10 picks up, to the extent possible, the workpiece W that can be picked up.

Figure 7:
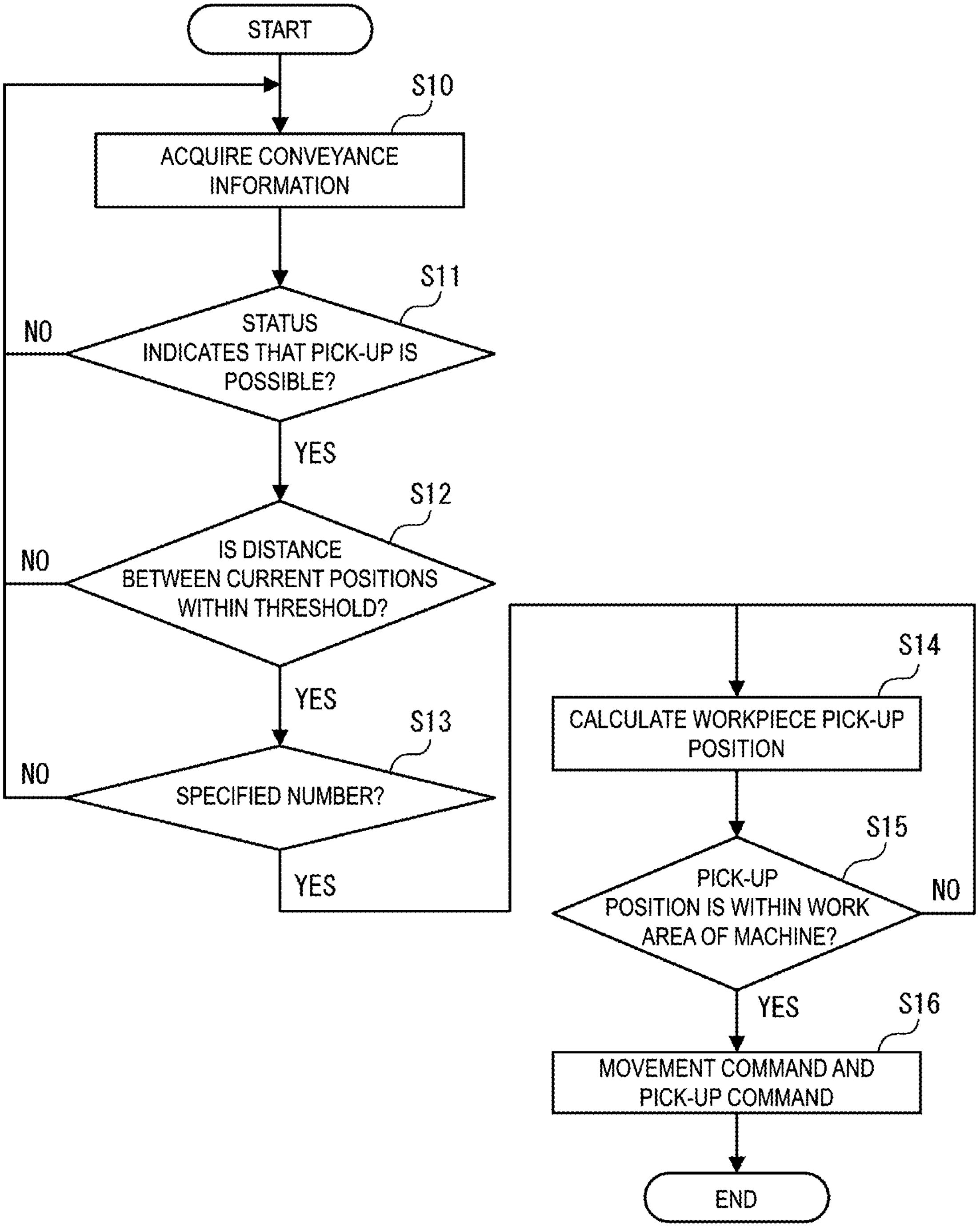
FIG. 7 is a flowchart illustrating a schematic operation of the controller according to the first embodiment.

Hereinafter, a schematic operation of the controller 20 according to the first embodiment will be described. FIG. 7 is a flowchart illustrating a schematic operation of the controller 20 according to the first embodiment. In step S10, the conveyance information acquisition unit 25 acquires the conveyance information from the storage part 24. In step S11 and step S12, the decision unit 27 determines whether or not the workpiece W is picked up. In step S11, the determination unit 27*b* determines whether or not the status of the workpiece W included in the conveyance information indicates that the workpiece W is picked up. When the status of the workpiece W included in the conveyance information indicates that the workpiece W cannot be picked up (NO in step S11), the process returns to step S10, and the conveyance information acquisition unit 25 again acquires the conveyance information of the workpiece W located upstream of the workpiece W determined not to be picked up. When the status of the workpiece W included in the conveyance information indicates that the workpiece W can be picked up (YES in step S11), the process proceeds to step S12.

In step S12, the distance calculation unit 27*a* calculates the distance between the current positions included in the conveyance information, and the determination unit 27*b* determines whether or not the calculated distance between the current positions is within a threshold value. When the distance between the current positions is not within the threshold value (NO in step S12), the process returns to step S10, and the conveyance information acquisition unit 25 again acquires the conveyance information of the workpiece W located upstream of the workpiece W determined not to be picked up. If the distance between the current positions is within the threshold value range (YES in step S12), the process proceeds to step S13.

It should be noted that step S13 is an essential step when one piece of conveyance information is generated for one workpiece W, but is unnecessary when one piece of conveyance information is generated for a specified number of workpieces W. In step S13, it is determined whether or not the conveyance information acquisition unit 25 has acquired the specified number of pieces of conveyance information from the storage part 24. When the conveyance information acquisition unit 25 has not acquired the specified number of pieces of conveyance information from the storage part 24 (NO in step S13), the process returns to step S10, and the conveyance information acquisition unit 25 further acquires the conveyance information. When the conveyance information acquisition unit 25 has acquired the specified number of pieces of conveyance information from the storage part 24 (YES in step S13), the process proceeds to step S14.

In step S24, the control unit 29 calculates the workpiece pick-up position based on the current position included in the conveyance information. In step S15, the control unit 29 determines whether or not the workpiece pick-up position has entered the work area B of the machine 10. When the workpiece pick-up position is not within the work area B of the machine 10 (NO in step S15), the process returns to step S14, and the control unit 29 repeats the calculation of the workpiece pick-up position based on the current position included in the conveyance information. When the workpiece pick-up position enters the work area B of the machine 10 (YES in step S15), the process proceeds to step S16. In step S16, the control unit 29 transmits a movement command for moving to the workpiece pick-up position to the machine 10, and transmits, to the machine 10, a pick-up command for picking up the specified number of workpieces W when the machine 10 reaches the workpiece pick-up position.

As described above, according to the mechanical system 1 of the first embodiment, even when the status of the workpiece W included in the conveyance information indicates that the workpiece W cannot be picked up, even when the conveyance information is deleted because the workpiece W is defective, or even when the workpiece W is conveyed in a toothless state in which the workpiece W is missing from the row of workpieces W, the machine 10 picks up the specified number of workpieces W based on the conveyance information of the workpiece W or the workpiece W group located upstream of the workpiece W or the workpiece W group determined not to be picked up, so that the specified number of workpieces W can be picked up without omission.

Furthermore, according to the mechanical system 1 of the first embodiment, when one piece of conveyance information is generated for one workpiece W, the machine 10 can collectively pick up a specified number of workpieces W from workpieces W located immediately after the workpiece W determined not to be picked up. In other words, the machine 10 can pick up, to the extent possible, the workpieces W that can be picked up.

Furthermore, according to the mechanical system 1 of the first embodiment, the specified number of workpieces W can be picked up without omission by simple work of setting the specified number of workpieces W collectively picked up by the machine 10 and the threshold value of the distance between the current positions included in the conveyance information of the adjacent workpieces W or the adjacent workpiece W groups.

Figure 8:
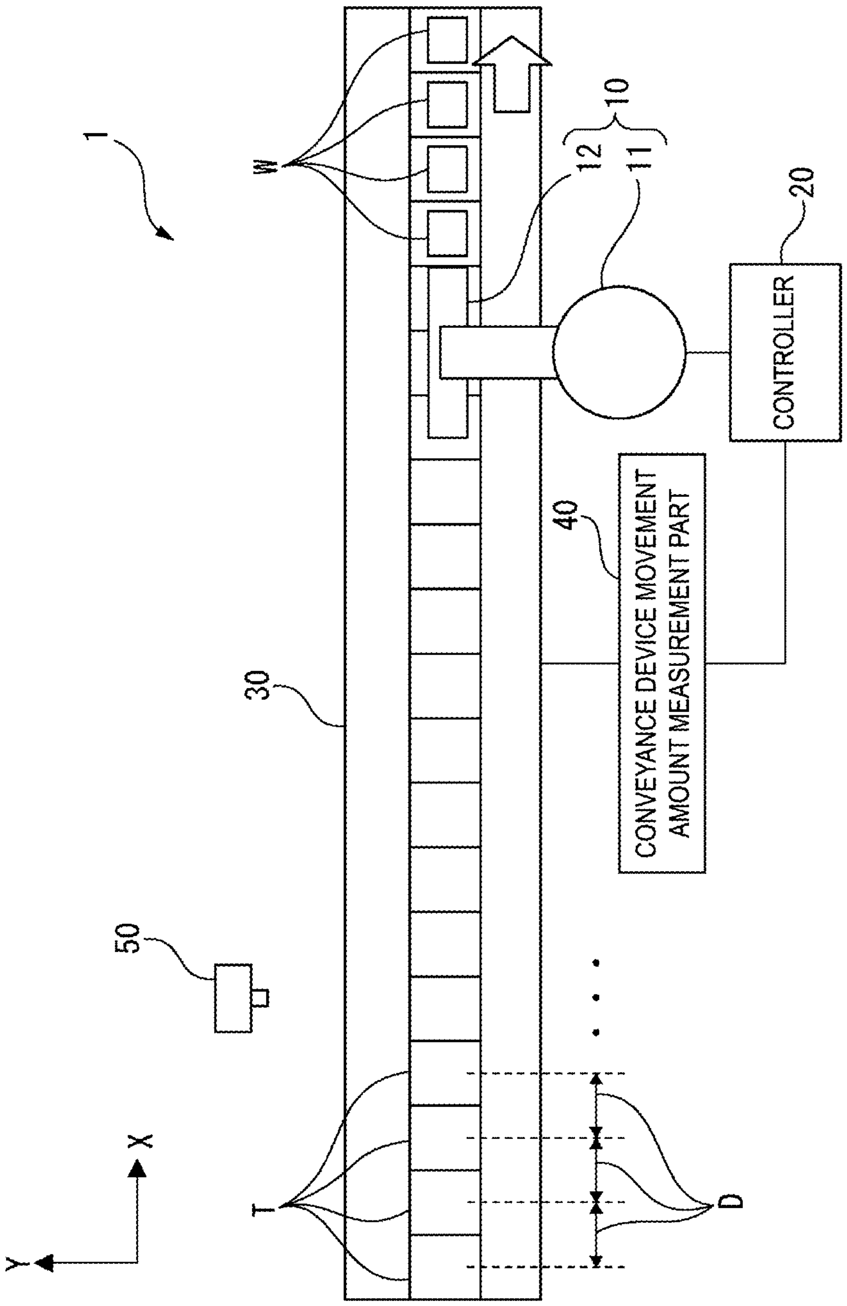
FIG. 8 is a configuration diagram of a mechanical system according to a second embodiment.

FIG. 8 is a configuration diagram of a mechanical system 1 according to a second embodiment. Hereinafter, only a part different from the mechanical system 1 of the first embodiment will be described, and description of the same configuration and the same operation as those of the mechanical system 1 of the first embodiment will be omitted. The mechanical system 1 determines whether or not taking out to the workpiece container T being conveyed is possible, and the specified number of workpieces W are collectively taken out based on the determination whether or not taking out to the workpiece container is possible. The mechanical system 1 determines whether or not taking out to the workpiece container T is possible, based on the status or the current position included in the conveyance information of the workpiece container T. In addition, the mechanical system 1 collectively takes out the specified number of workpieces W based on the conveyance information of the workpiece container T located upstream of the workpiece container T determined that taking out thereto is not possible.

The mechanical system 1 includes a machine 10 that collectively takes out a specified number of workpieces W, and a controller 20 that controls the machine 10. In addition, the mechanical system 1 may include a conveyance device movement amount measurement part 40 that measures a movement amount of the conveyance device 30 in order to obtain a current position of the workpiece container T being conveyed. The movement amount of the conveyance device 30 includes a current position, a current speed, and the like of the conveyance device 30. The mechanical system 1 may include a vision sensor 50 instead of the conveyance device movement amount measurement part 40 or in addition to the conveyance device movement amount measurement part 40 in order to obtain not only the current position, the current speed, and the like of the workpiece container T being conveyed but also the current orientation, the type, the status, and the like of the workpiece container T being conveyed.

The workpiece container T is supplied to the conveyance device 30 upstream in the conveying direction X, is conveyed in the conveying direction X by the conveyance device 30, and the workpiece W is taken out by the machine 10 downstream in the conveying direction X. The workpiece containers T are conveyed at substantially constant conveyance intervals D, but may not necessarily be conveyed at exactly constant conveyance intervals D. Further, the workpiece containers T are conveyed in a single row, but may be conveyed in a plurality of rows such as two rows and three rows, as described in an embodiment described later. For example, the workpiece container is a tray, but in other embodiments, the workpiece container may be a workpiece container having another shape such as a bucket or cardboard. The conveyance device 30 may convey one type of workpiece containers T having the same shape and the same size, or may convey a plurality of types of workpiece containers T having different shapes and different sizes. The machine 10 takes out the workpiece W to one type or a plurality of types of workpiece containers T.

The machine 10 collectively takes out a specified number of workpieces W to the workpiece container T conveyed by the conveyance device 30. The machine 10 takes out one workpiece W to one workpiece container T, but may take out a specified number of workpieces W to one workpiece container T. For example, the machine 10 includes a robot 11 and a hand 12 attached to the robot 11. In other embodiments, the machine 10 may be another type of machine capable of collectively taking out a specified number of workpieces W instead of the robot 11 and the hand 12.

The robot 11 moves the hand 12 to the workpiece take-out position. The workpiece take-out position is the center position of the workpiece container T group obtained by averaging the current positions of the specified number of workpiece containers T, but may be the current position of the workpiece container T supplied first among the specified number of workpiece containers T, the current position of the workpiece container T supplied last among the specified number of workpiece containers T, or the like. The hand 12 collectively takes out a specified number of workpieces W at the workpiece take-out position.

The controller 20 controls the machine 10 based on the conveyance information of the workpiece container T. The controller 20 generates one piece of conveyance information for one workpiece container T, but may generate one piece of conveyance information for a specified number of workpiece containers T. The conveyance information of the workpiece container T includes a current position, a current speed, a current orientation, a type, a status, and the like of the workpiece container T. The controller 20 updates the current position, the current speed, and the like of the workpiece container T based on the movement amount of the conveyance device 30 acquired from the conveyance device movement amount measurement part 40. In other embodiments, the controller 20 may update the current orientation, the type, the status, and the like of the workpiece W in addition to the current position, the current speed, and the like of the workpiece container T, based on the visual information acquired from the vision sensor 50. In addition, the controller 20 updates the status indicating whether or not taking out to the workpiece container T is possible, based on the work performance of the machine 10 or the type of the workpiece container T to which the workpiece W can be taken out by the machine 10.

The controller 20 determines, based on the status or the current position included in the conveyance information of the workpiece container T, whether or not taking out to the workpiece container T is possible. When the status included in the conveyance information of the workpiece container T indicates that the workpiece W can be taken out to the workpiece container T, the controller 20 determines that the workpiece W can be taken out to the workpiece container T, and when the status included in the conveyance information of the workpiece container T indicates that the workpiece W cannot be taken out to the workpiece container T, the controller 20 determines that the workpiece W cannot be taken out to the workpiece container T. In other words, the controller 20 determines whether or not the workpiece T can be taken out to the workpiece container T in response to the work performance of the machine 10 or the type of workpiece container T to which the workpiece T can be taken out by the machine 10.

When the distance between the current positions included in the conveyance information of the workpiece container T is within the threshold value, the controller 20 determines that the workpiece T can be taken out to the workpiece container T, and when the distance between the current positions included in the conveyance information of the workpiece container T is not within the threshold value, the controller determines that the workpiece T cannot be taken out to the workpiece container T. In other words, when the conveyance information of the workpiece container T is deleted because the workpiece container T is defective or when the workpiece container T is missing from the row of workpiece containers T being conveyed, the controller 20 determines that the workpiece W cannot be taken out to the workpiece container T.

The controller 20 controls the machine 10 by generating a command for collectively taking out a specified number of workpieces W based on the conveyance information of the workpiece container T located upstream of the workpiece container T determined to which the workpiece W can be taken out. The command for collectively taking out the specified number of workpieces W includes a movement command for moving to the workpiece take-out position and a take-out command for taking out the specified number of workpieces W. The machine 10 collectively takes out a specified number of workpieces W in response to a command from the controller 20.

The conveyance device 30 conveys one or more workpiece containers T. The conveyance device movement amount measurement part 40 measures the movement amount of the conveyance device 30. In other embodiments, the mechanical system 1 may include a different type of sensor such as the vision sensor 50 instead of the conveyance device movement amount measurement part 40 or in addition to the conveyance device movement amount measurement part 40. When the vision sensor 50 is used, the controller 20 may acquire not only the current position, the current speed, and the like of the workpiece container T but also the current orientation, the type, the status, and the like of the workpiece container T based on the visual information acquired from the vision sensor 50.

Figure 9:
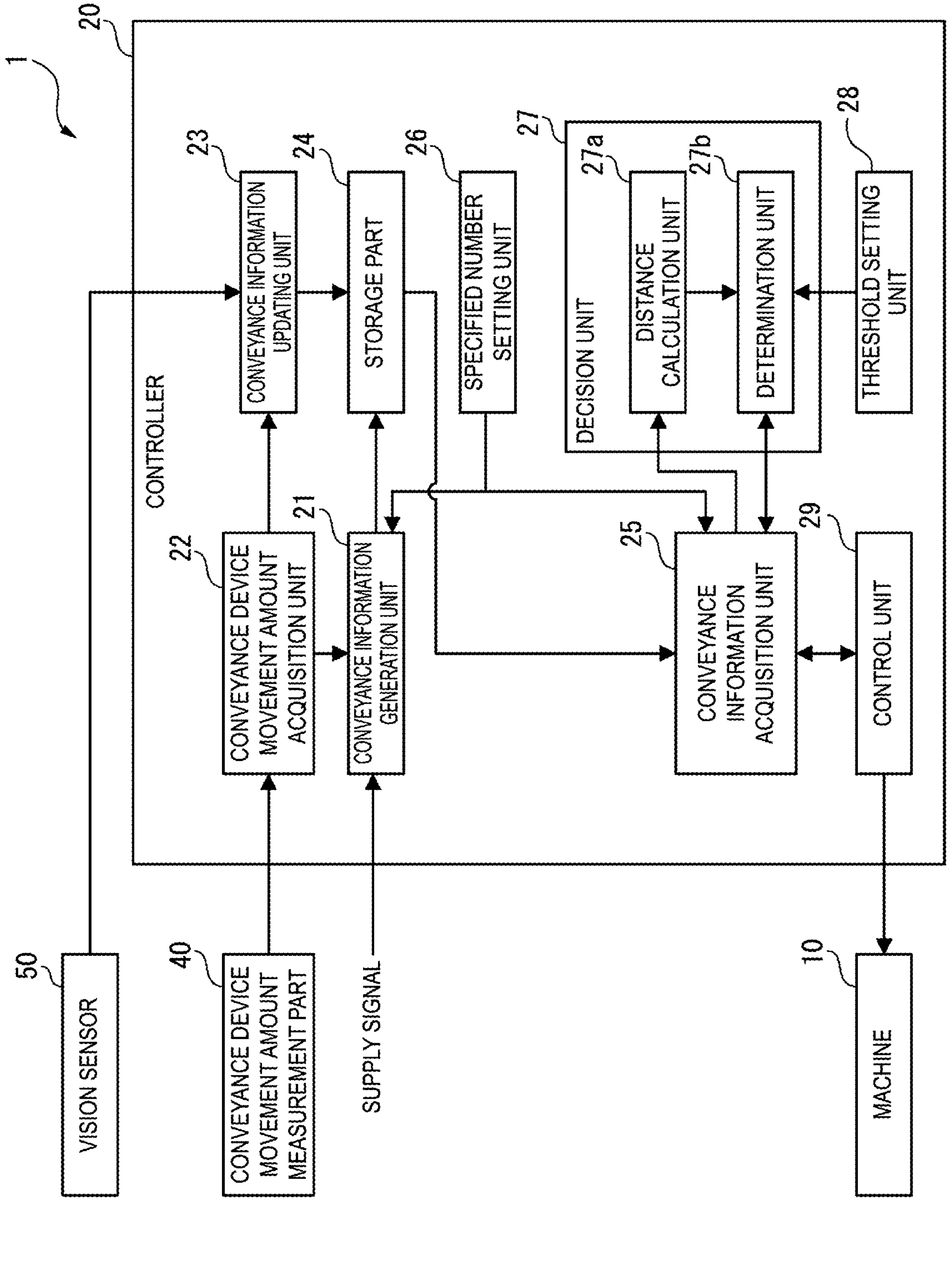
FIG. 9 is a functional block diagram of the mechanical system according to the second embodiment.

FIG. 9 is a functional block diagram of the mechanical system 1 according to the second embodiment. Although the constituent elements of the mechanical system 1 of the second embodiment are the same as the constituent elements of the mechanical system 1 of the first embodiment, it should be noted that the processing target is changed from the workpiece W to the workpiece container T. Although one workpiece W is taken out to one workpiece container T, it should be noted that a specified number of workpieces W may be taken out to one workpiece container T.

The conveyance information generation unit 21 generates one piece of conveyance information for one workpiece container T or generates one piece of conveyance information for a specified number of workpiece containers T. The conveyance information generation unit 21 acquires the set specified number from the specified number setting unit 26. For example, the conveyance information generation unit 21 receives a supply signal of the workpiece container T from an external device (not illustrated) every time one workpiece container T is supplied to the conveyance device 30, and generates one piece of conveyance information for one supply signal or generates one piece of conveyance information for a specified number of supply signals.

The conveyance information generation unit 21 generates conveyance information in which initial values such as a current position, a current speed, a current orientation, a type, and a status of the workpiece container T are set. The conveyance information generation unit 21 transmits the generated conveyance information to the storage part 24. In order to simplify the subsequent processes, the conveyance information generation unit 21 may store the conveyance information in the storage part 24 in the order of conveyance of the workpiece containers T.

The conveyance device movement amount acquisition unit 22 acquires the movement amount of the conveyance device 30 from the conveyance device movement amount measurement part 40. The conveyance device movement amount acquisition unit 22 transmits the acquired movement amount of the conveyance device 30 to the conveyance information updating unit 23.

The conveyance information updating unit 23 updates the conveyance information of the workpiece container T stored in the storage part 24 based on the movement amount of the conveyance device 30, but may update the conveyance information of the workpiece container T stored in the storage part 24 based on the visual information acquired from the vision sensor 50. For example, the conveyance information updating unit 23 updates the current position, the current speed, and the like of the workpiece container T stored in the storage part 24 based on the movement amount of the conveyance device 30, or updates the current position, the current speed, the current orientation, the type, the status, and the like of the workpiece container T stored in the storage part 24, based on the visual information acquired from the vision sensor 50.

The storage part 24 stores the conveyance information of the workpiece containers T in the order of conveyance of the workpiece containers T. Although not illustrated, the storage part 24 is a memory that stores various types of data. The memory includes a semiconductor storage device such as a RAM and a ROM, a magnetic storage device such as an HDD, and the like.

The specified number setting unit 26 sets a specified number of the workpieces W that is collectively taken out by the machine 10. The specified number setting unit 26 sets a specified number specified by a user via a user interface unit (not illustrated) such as a touch panel display or a keyboard. Since the range of specified number that can be collectively taken out depends on the type of machine 10 (that is, the hand 12), the specified number setting unit 26 may have an initial value of the range of specified number in response to the type of machine 10. The specified number setting unit 26 transmits the set specified number to the conveyance information generation unit 21 and the conveyance information acquisition unit 25.

The conveyance information acquisition unit 25 acquires the conveyance information of the workpiece container T from the storage part 24. In a case where one piece of conveyance information is generated for one workpiece container T, when one workpiece W is taken out to one workpiece container T, the conveyance information acquisition unit 25 acquires the set specified number from the specified number setting unit 26 and sequentially acquires the specified number of pieces of conveyance information from the storage part 24 in the order of conveyance of the workpiece containers T. Furthermore, in a case where one piece of conveyance information is generated for one workpiece container T, when a specified number of workpieces W are taken out to one workpiece container T, the conveyance information acquisition unit 25 may acquire one piece of conveyance information from the storage part 24 in the order of conveyance of the workpiece containers T. Furthermore, when one piece of conveyance information is generated for the specified number of workpiece containers T, only one workpiece W can be taken out to one workpiece container T, and the conveyance information acquisition unit 25 acquires one piece of conveyance information from the storage part 24 in the order of conveyance of the workpiece containers T. The conveyance information acquisition unit 25 transmits the conveyance information of the workpiece container T to the decision unit 27 in the order of conveyance of the workpiece containers T in order to confirm whether or not taking out to the workpiece container T is possible.

The decision unit 27 determines, based on the status or the current position included in the conveyance information of the workpiece container T, whether or not taking out to the workpiece container T is possible. The decision unit 27 includes a distance calculation unit **27*a* and a determination unit 27*b*. The determination unit 27*b* determines whether or not the status included in the conveyance information of the workpiece container T indicates that taking out to the workpiece container T is possible. When the status included in the conveyance information of the workpiece container T indicates that taking out to the workpiece container T is possible, the determination unit 27*b*** determines that taking out to the workpiece container T or the workpiece container T group corresponding to the conveyance information is possible, and when the status included in the conveyance information of the workpiece container T indicates that taking out to the workpiece container T is not possible, the determination unit determines that taking out to the workpiece container T or the workpiece container T group corresponding to the conveyance information is not possible.

In addition, the distance calculation unit 27*a* calculates the distance between the current positions included in the conveyance information of the adjacent workpiece containers T or the workpiece container T groups, and the determination unit 27*b* determines whether or not the calculated distance between the current positions is within a threshold value. When the calculated distance between the current positions is within the threshold value, the determination unit 27*b* determines that taking out to the adjacent workpiece containers T or workpiece container T groups is possible, and when the calculated distance between the current positions is not within the threshold value, the determination unit determines that taking out to the workpiece container T located downstream or the adjacent workpiece container T groups is possible. The decision unit 27 transmits to the conveyance information acquisition unit 25 whether or not taking out to the workpiece container T is not possible.

The threshold value setting unit 28 sets the threshold value of the distance between the current positions included in the conveyance information of the adjacent workpiece containers T or the adjacent workpiece container T groups. The threshold value setting unit 28 sets a threshold value specified by the user via a user interface unit (not illustrated) such as a touch panel display or a keyboard. Since the conveyance interval D of the workpiece container T may not be constant, the threshold value setting unit 28 may set a range obtained by adding or subtracting an offset to or from the conveyance interval D of the workpiece container T as the threshold value. When one piece of conveyance information is generated for the specified number of workpiece containers T, the threshold value setting unit 28 may set, as the threshold value, a range obtained by multiplying the specified number by the conveyance interval D of the workpiece containers T and adding or subtracting an offset to or from the multiplied value. The threshold value setting unit 28 transmits the set threshold value to the determination unit 27*b*.

In a case where one piece of conveyance information is generated for one workpiece container T, when the decision unit 27 determines that taking out to the workpiece container T or the workpiece container T group is possible, the conveyance information acquisition unit 25 sequentially acquires the conveyance information from the storage part 24 until the specified number is reached, and when the decision unit 27 determines that taking out to the workpiece container T or the workpiece container T group is not possible, the conveyance information acquisition unit 25 again acquires, from the storage part 24, the conveyance information of the workpiece container T or the workpiece container T group located upstream of the workpiece container T or the workpiece container T group determined that taking out thereto is not possible. When the specified number of pieces of conveyance information can be acquired from the storage part 24, the conveyance information acquisition unit 25 transmits the specified number of pieces of conveyance information to the control unit 29.

Alternatively, when one piece of conveyance information is generated for a specified number of workpiece containers T, the conveyance information acquisition unit 25 transmits one piece of conveyance information to the control unit 29 when the decision unit 27 determines that taking out to the workpiece container T group is possible, and the conveyance information acquisition unit 25 again acquires one piece of conveyance information from the storage part 24 when the decision unit 27 determines that taking out to the workpiece container T is not possible.

The control unit 29 calculates a workpiece take-out position based on the current position included in the conveyance information, generates, based on the workpiece take-out position, a command for collectively taking out a specified number of workpieces W, and transmits the generated command to the machine 10. When one piece of conveyance information is generated for one workpiece container T, the control unit 29 calculates the workpiece take-out position based on the current position included in each of the specified number of pieces of conveyance information. Furthermore, when one piece of conveyance information is generated for a specified number of workpiece containers T, the control unit 29 calculates the workpiece take-out position based on the current position included in the conveyance information. The workpiece take-out position is the center position of the workpiece container T group obtained by averaging the current positions of the specified number of workpiece containers T, but may be the current position of the workpiece container T supplied first among the specified number of workpiece containers T, the current position of the workpiece container T supplied last among the specified number of workpiece containers T, or the like. The control unit 29 continues to calculate the workpiece take-out position until the machine 10 collectively takes out the specified number of workpieces W.

The control unit 29 determines whether or not the workpiece take-out position has entered the work area of the machine 10. When the workpiece take-out position enters the work area of the machine 10, the control unit 29 generates a command for collectively taking out the specified number of workpieces W, and transmits the command to the machine 10. The command for collectively taking out the specified number of workpieces W includes a movement command for moving to the workpiece take-out position and a take-out command for taking out the specified number of workpieces W. The control unit 29 continues to transmit the movement command for moving to the workpiece take-out position to the machine 10 until the machine 10 reaches the workpiece take-out position, and transmits the command for taking out the specified number of workpieces W to the machine 10 when the machine 10 reaches the workpiece take-out position.

The machine 10 tracks the workpiece container T or the workpiece container T group in response to a command from the controller 20, and collectively takes out a specified number of workpieces W when reaching the workpiece take-out position. After the specified number of workpieces W are collectively taken out, the machine 10 collectively picks up the specified number of workpieces W. After the specified number of workpieces W are collectively picked up, the machine 10 repeats the above-described operations in order to collectively take out the specified number of workpieces W.

Figure 10:
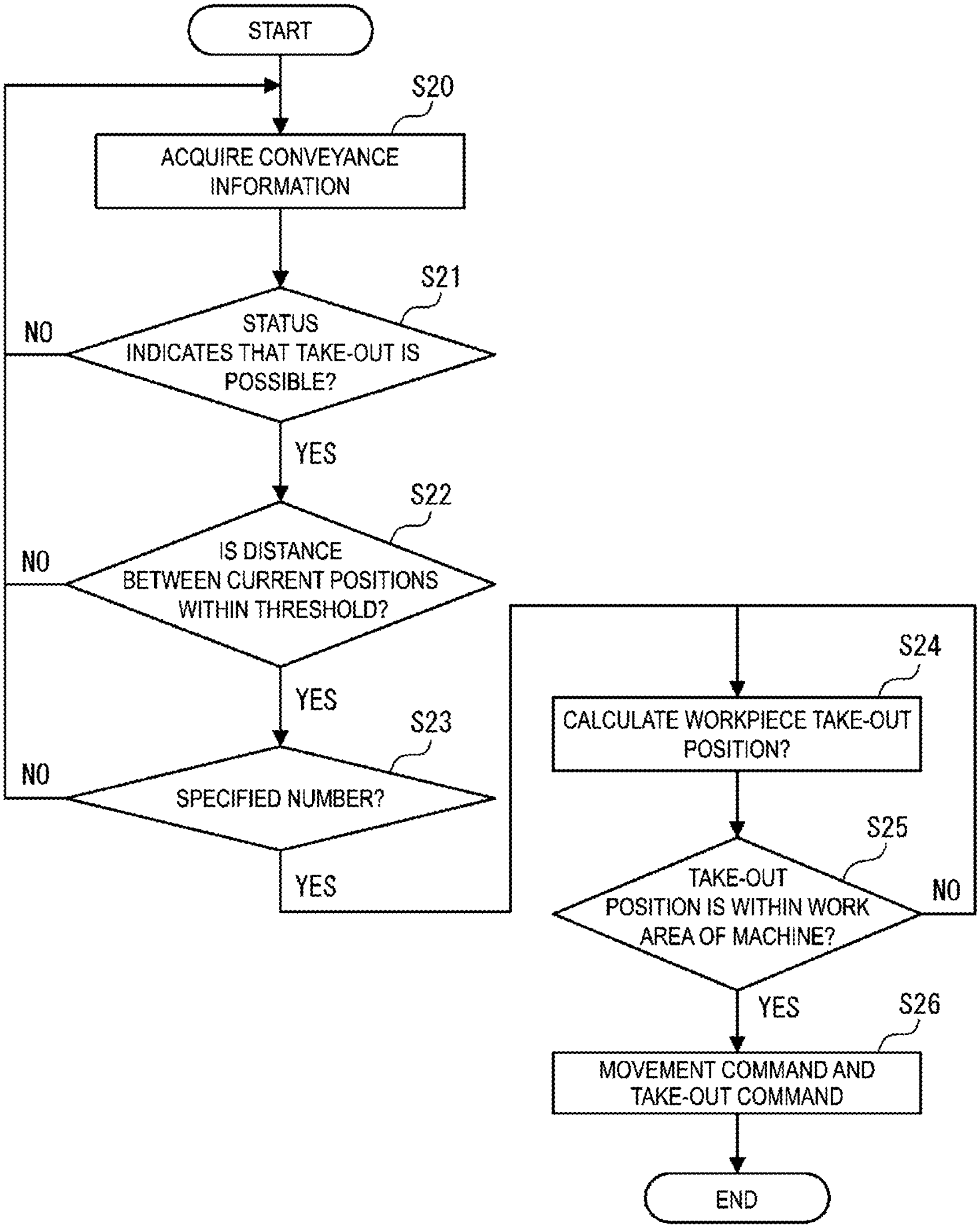
FIG. 10 is a flowchart of a controller according to the second embodiment.

Hereinafter, a schematic operation of the controller 20 of the second embodiment will be described. FIG. 10 is a flowchart illustrating a schematic operation of the controller 20 of the second embodiment. In step S20, the conveyance information acquisition unit 25 acquires the conveyance information from the storage part 24. In step S21 and step S22, the decision unit 27 determines whether or not the workpiece is taken out to the workpiece container T. In step S21, the determination unit 27*b* determines whether or not the status of the workpiece container T included in the conveyance information indicates that taking out to the workpiece container T is possible. When the status of the workpiece container T included in the conveyance information indicates that taking out to the workpiece container T is not possible (NO in Step S21), the process returns to step S20, and the conveyance information acquisition unit 25 acquires the conveyance information of the workpiece container T located upstream of the workpiece container T determined that taking out thereto is not possible. When the status of the workpiece container T included in the conveyance information indicates that taking out to the workpiece container T is possible (YES in step S21), the process proceeds to step S22.

In step S22, the distance calculation unit 27*a* calculates the distance between the current positions included in the conveyance information, and the determination unit 27*b* determines whether or not the calculated distance between the current positions is within a threshold value. When the distance between the current positions is not within the threshold value (NO in step S22), the process returns to step S20, and the conveyance information of the workpiece container T located upstream of the workpiece container T determined that taking out thereto is not possible is acquired again. If the distance between the current positions is within the threshold value (YES in step S21), the process proceeds to step S23.

It should be noted that step S23 is an essential step when one piece of conveyance information is generated for one workpiece container T, but it is unnecessary when one piece of conveyance information is generated for a specified number of workpiece containers T. In step S23, when the conveyance information generation unit 21 generates one piece of conveyance information for one workpiece container T, it is determined whether or not the conveyance information acquisition unit 25 has acquired the specified number of pieces of conveyance information from the storage part 24. When the conveyance information acquisition unit 25 has not acquired the specified number of pieces of conveyance information from the storage part 24 (NO in step S23), the process returns to step S20, and the conveyance information acquisition unit 25 further acquires the conveyance information. When the conveyance information acquisition unit 25 has acquired the specified number of pieces of conveyance information from the storage part 24 (YES in step S23), the process proceeds to step S24.

In step S24, the control unit 29 calculates the workpiece take-out position based on the current position included in the conveyance information. In step S25, the control unit 29 determines whether or not the workpiece take-out position has entered the work area B of the machine 10. When the workpiece take-out position is not within the work area B of the machine 10 (NO in step S25), the process returns to step S14, and the control unit 29 repeats the calculation of the workpiece take-out position based on the current position included in the conveyance information. When the workpiece take-out position enters the work area B of the machine 10 (YES in step S15), the process proceeds to step S16. In step S16, the control unit 29 transmits a movement command for moving to the workpiece take-out position to the machine 10, and transmits, to the machine 10, a take-out command for taking out the specified number of workpieces W when the machine 10 reaches the workpiece take-out position.

As described above, according to the mechanical system 1 of the second embodiment, even when the status of the workpiece container T included in the conveyance information indicates that taking out to the workpiece container T is not possible, even when the conveyance information is deleted because the workpiece container T is defective, or even when the workpiece container T is conveyed in the toothless state in which the workpiece container T is missing from the row of workpiece containers T, the machine 10 takes out the specified number of workpieces W to the workpiece container T based on the conveyance information of the workpiece container T or the workpiece container T group located upstream of the conveyance information of the workpiece container T or the workpiece container T group determined that taking out thereto is not possible, so that the specified number of workpieces W can be taken out without omission.

Furthermore, according to the mechanical system 1 of the second embodiment, when one piece of conveyance information is generated for one workpiece W, the machine 10 can collectively take out the specified number of workpieces W from the workpiece container T immediately after the workpiece container T determined that taking out thereto is not possible. In other words, the machine 10 can take out to the dispensable workpiece container T to the extent possible.

Further, according to the mechanical system 1 of the second embodiment, the specified number of workpieces W can be taken out without omission by simple work of setting the specified number of workpieces W collectively taken out by the machine 10 and the threshold value of the distance between the current positions included in the conveyance information of the adjacent workpiece containers T or the workpiece container T groups.

Figure 11:
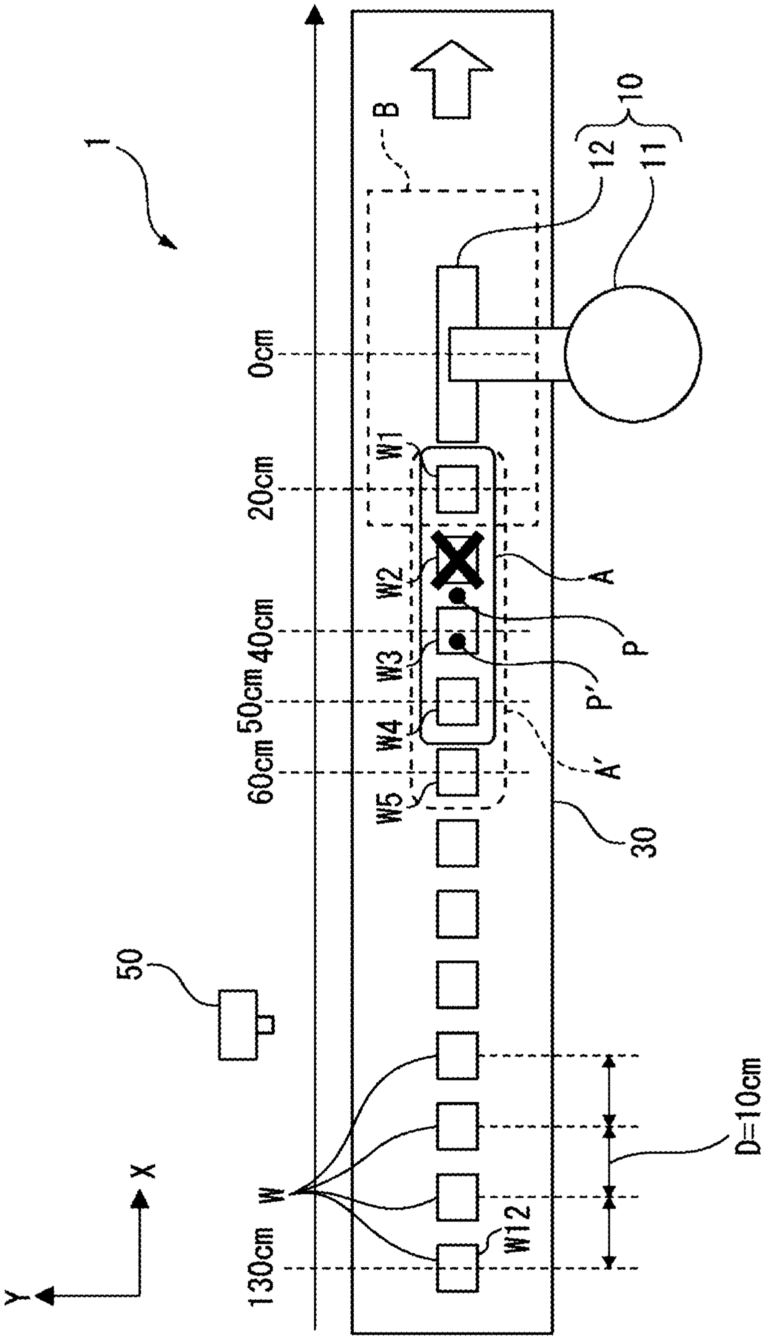
FIG. 11 is a diagram illustrating Example 3-1 of a mechanical system according to a third embodiment.

FIG. 11 is a diagram illustrating Example 3-1 of a mechanical system 1 of a third embodiment. Hereinafter, only a part different from the mechanical system 1 of the first embodiment or the second embodiment will be described, and description of the same configuration and the same operation as those of the mechanical system 1 of the first embodiment or the second embodiment will be omitted. The mechanical system 1 according to the third embodiment includes an extendable hand 12, determines whether or not the workpiece W being conveyed is picked up or is taken out to the workpiece container T being conveyed, extends/retracts the hand 12 based on the determination whether or not picking up or taking out is possible, in order to collectively pick up or collectively take out the specified number of workpieces W. The mechanical system 1 extends/retracts the hand 12 based on the current position included in the conveyance information of the workpiece W or the workpiece container T. The hand 12 is preferably a suction-type hand that includes a plurality of suction portions (not illustrated) and is extendable between the suction portions. One suction unit corresponds to one workpiece W, and the length between the suction portions corresponds to the conveyance interval D.

The example will be described also with reference to FIG. 2. The prerequisites for the example are as follows.

One type or a plurality of types of workpieces W are conveyed in one row at the conveyance interval D=10 cm.

The specified number setting unit 26 sets the specified number of workpieces W to be collectively picked up by the machine 10 to four.

The machine 10 picks up the workpiece W in a work area B±25 cm at the X coordinate of the machine coordinate system.

The hand 12 is configured to collectively pick up one to four workpieces W. The hand 12 is a suction-type hand including four suction portions (not illustrated) and can be extended and retracted between the suction portions. The extending range of the hand 12 is from 30 cm to 80 cm (=the distance between the most downstream workpiece W and the most upstream workpiece W).

The conveyance information generation unit 21 generates one piece of conveyance information (W1 to W12) for one workpiece W.

The storage part 24 stores the conveyance information W1 to W12 in the order of conveyance of the workpieces W.

The current positions of the workpieces W included in the conveyance information W1 to W12 are 20 cm, 30 cm, 40 cm, . . . , and 130 cm, respectively, in the X coordinate of the machine coordinate system.

The threshold value setting unit 28 sets the threshold value of the distance between the current positions included in the conveyance information of the most downstream workpiece W and the most upstream workpiece W among the specified number of workpieces W to 30 cm to 80 cm (the extending range of the hand 12).

The status of the workpiece W included in the conveyance information W2 indicates that the workpiece W cannot be picked up (indicated by an "x" mark), depending on the work performance of the machine 10 or the type of workpiece W that can be picked up by the machine 10.

The conveyance information acquisition unit 25 sequentially acquires the specified number of four pieces of conveyance information W1 to W4 from the storage part 24, and sequentially transmits the conveyance information to the decision unit 27. The decision unit 27 sequentially determines whether or not the workpiece W is picked up, based on the status of the workpiece W included in each piece of conveyance information W1 to W4. Since the status of the workpiece W included in the conveyance information W1 indicates that the workpiece W can be picked up, the determination unit 27*b* determines that the workpiece W corresponding to the conveyance information W1 can be picked up. In addition, since the status of the workpiece W included in the conveyance information W2 indicates that the workpiece W cannot be picked up (indicated by an "x" mark), the determination unit 27*b* determines that the workpiece W corresponding to the conveyance information W2 cannot be picked up. The decision unit 27 transmits, to the conveyance information acquisition unit 25, the determination that the workpiece W corresponding to the conveyance information W2 cannot be picked up.

The conveyance information acquisition unit 25 does not count, as the specified number, the conveyance information W2 (indicated by an "x" mark) indicating the determination that picking up is not possible, sequentially acquires the conveyance information W3 to W5 from the storage part 24, and transmits the acquired conveyance information to the decision unit 27. The decision unit 27 sequentially determines whether or not the workpiece W is picked up, based on the status of the workpiece W included in the conveyance information W3 to W5. The determination unit 27*b* determines that the workpieces W corresponding to the conveyance information W3 to W5 can be picked up since all the statuses of the workpieces W included in the conveyance information W3 to W5 indicate that the workpieces W can be picked up. The decision unit 27 sequentially transmits, to the conveyance information acquisition unit 25, the determination that the workpieces W corresponding to the conveyance information W1 and W3 to W5 can be picked up. Since the specified number of four pieces of conveyance information W1 and W3 to W5 of the workpieces W determined that they can be picked up have been acquired from the storage part 24, the conveyance information acquisition unit 25 transmits the conveyance information W1 and W3 to W5 to the control unit 29.

The control unit 29 determines the extending position and the extending length of the hand 12 based on the distances between the current positions included in each of the conveyance information W1 and W3 of the adjacent workpieces W, the conveyance information W3 and W4 of the adjacent workpieces W, and the conveyance information W4 and W5 of the adjacent workpieces W. Since the distance (20 cm) between the current positions included in the conveyance information W1 and W3 of the adjacent workpieces W is larger than the conveyance interval (10 cm) by the difference of 10 cm, the control unit 29 determines the extending/retracting position of the hand 12 between the workpieces W corresponding to the conveyance information W1 and W3, respectively, and determines the extending/contracting length of the hand 12 to be the difference of 10 cm.

The control unit 29 calculates the workpiece pick-up position P' (42.5 cm) based on the current positions (20 cm, 40 cm, 50 cm, and 60 cm) of the workpieces W included in the conveyance information W1 and W3 to W5. In other words, the original workpiece pick-up position P (35 cm) is corrected to the workpiece pick-up position P' (42.5 cm) based on the current position of the workpiece W included in the conveyance information W1 and W3 to W5 of the workpiece W determined that it can be picked up. Stated otherwise, the original workpiece pick-up area A is corrected to the workpiece pick-up area A' by the conveyance information W1 and W3 to W5 of the workpieces W determined to be picked up.

The control unit 29 continues to calculate the workpiece pick-up position P' based on the current position of the workpiece W included in each piece of conveyance information W1 and W3 to W5 until the specified number of four workpieces W are picked up. When the workpiece pick-up position P' enters the work area B (±25 cm) of the machine 10, the control unit 29 continues to transmit a movement command for moving to the workpiece pick-up position P' to the machine 10, and tracks the specified number of four workpieces W. When the machine 10 reaches the specified number of four workpieces W, the control unit 29 transmits, to the machine 10, an extending/retracting command for extending/retracting the hand 12 and a pick-up command for picking up the specified number of four workpieces W.

As described above, according to the mechanical system 1 of the third embodiment, even when the status included in the conveyance information W2 indicates that the workpiece W cannot be picked up, the machine 10 can pick up the specified number of four workpieces W without omission by extending and retracting the hand 12 based on the conveyance information W1 and W3 to W5 of the workpieces W determined to be picked up. In addition, since one piece of conveyance information is generated for one workpiece W and the hand 12 extends and retracts, the machine 10 can pick up a workpiece W that can be picked up to the extent possible across the workpiece W determined not to be picked up.

Figure 12:
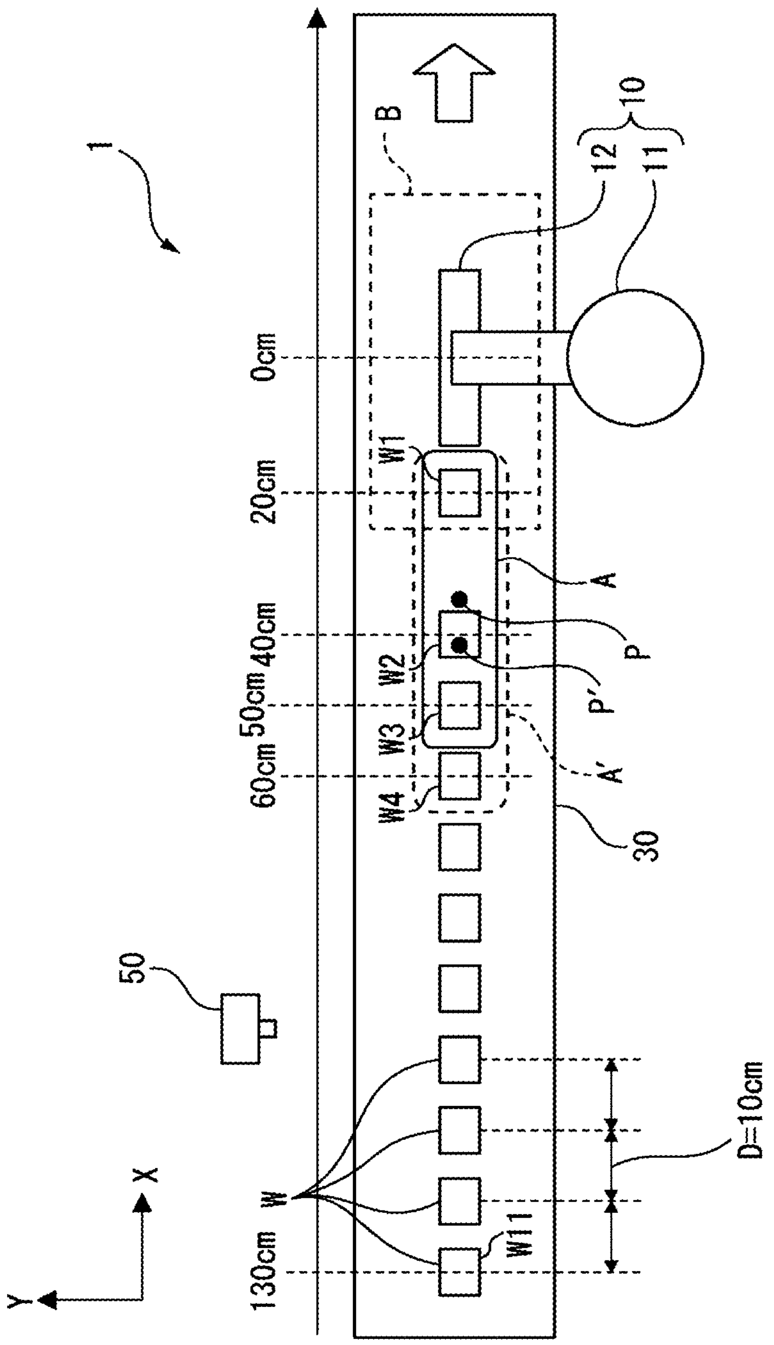
FIG. 12 is a diagram illustrating Example 3-2 of the mechanical system according to the third embodiment.

FIG. 12 is a diagram illustrating Example 3-2 of the mechanical system 1 of the third embodiment. The example will be described also with reference to FIG. 2. The prerequisites for the example are as follows.

- One type or a plurality of types of workpieces W are conveyed in one row at the conveyance interval D=10 cm.
- The specified number setting unit 26 sets the specified number of workpieces W to be collectively picked up by the machine 10 to four.
- The machine 10 picks up the workpiece W in a work area B±25 cm at the X coordinate of the machine coordinate system.
- The hand 12 is configured to collectively pick up one to four workpieces W. The hand 12 is a suction-type hand including four suction portions (not illustrated) and can be extended and retracted between the suction portions. The extending range of the hand 12 is from 30 cm to 80 cm (=the distance between the most downstream workpiece W and the most upstream workpiece W).
- The conveyance information generation unit 21 generates one piece of conveyance information (W1 to W11) for one workpiece W.
- The storage part 24 stores the conveyance information W1 to W11 in the order of conveyance of the workpieces W.
- The current positions of the workpieces W included in the conveyance information W1 to W11 are 20 cm, 40 cm, 50 cm, . . . , and 130 cm, respectively, in the X coordinate of the machine coordinate system.
- The threshold value setting unit 28 sets the threshold value of the distance between the current positions included in the conveyance information of the most downstream workpiece W and the most upstream workpiece W among the specified number of workpieces W to 30 cm to 80 cm (the extending range of the hand 12).
- Between the workpiece W corresponding to the conveyance information W1 and the workpiece W corresponding to the conveyance information W2, one piece of conveyance information is deleted because the workpiece W is defective, or one piece of conveyance information is missing because the workpiece W is supplied in a toothless state in which one workpiece W is missing from the row of workpieces W.

The conveyance information acquisition unit 25 sequentially acquires the conveyance information W1 to W4 of the specified number of four workpieces W from the storage part 24 and sequentially transmits the conveyance information to the decision unit 27. The decision unit 27 sequentially determines whether or not the workpiece W can be picked up based on the distance between the current positions included in the conveyance information W1 and W4 of the most downstream workpiece W and the most upstream workpiece W. When the distance calculation unit 27*a* calculates the distance (40 cm) between the current positions (20 cm and 60 cm) included in the conveyance information W1 and W4 of the most downstream workpiece W and the most upstream workpiece W, respectively, the calculated distance (40 cm) between the current positions is within the threshold value (30 cm to 80 cm), and thus the determination unit 27*b* determines that the workpieces W corresponding to the conveyance information W1 to W4 can be picked up. The decision unit 27 sequentially transmits, to the conveyance information acquisition unit 25, the determination that the workpieces W corresponding to the conveyance information W1 to W4 can be picked up. Since the specified number of four pieces of conveyance information W1 to W4 have been acquired from the storage part 24, the conveyance information acquisition unit 25 transmits the conveyance information W1 to W4 to the control unit 29.

The control unit 29 determines the extending/retracting position and the extending/retracting length of the hand 12 based on the distances between the current positions included in the conveyance information W1 and W2 of the adjacent workpieces W, the conveyance information W2 and W3 of the adjacent workpieces W, and the conveyance information W3 and W4 of the adjacent workpieces W. Since the distance (20 cm) between the current positions included in the conveyance information W1 and W2 of the adjacent workpieces W is larger than the conveyance interval (10 cm) by the difference of 10 cm, the control unit 29 determines the extending/retracting position of the hand 12 between the workpieces W corresponding to the conveyance information W1 and W2, respectively, and determines the extending/retracting length of the hand 12 to be the difference of 10 cm.

The control unit 29 calculates the workpiece pick-up position P' (42.5 cm) based on the current positions (20 cm, 40 cm, 50 cm, and 60 cm) of the workpieces W included in the conveyance information W1 to W4. In other words, the original workpiece pick-up position P (35 cm) is corrected to the workpiece pick-up position P' (42.5 cm) based on the current position of the workpiece W included in the conveyance information W1 to W4 of the workpiece W determined to be picked up. Stated otherwise, the original workpiece pick-up area A is corrected to the workpiece pick-up area A' by the conveyance information W1 to W4 of the workpieces W determined to be picked up.

The control unit 29 continues to calculate the workpiece pick-up position P' based on the current position of the workpiece W included in each of conveyance information W1 to W4 until the specified number of four workpieces W are picked up. When the workpiece pick-up position P' enters the work area B (±25 cm) of the machine 10, the control unit 29 continues to transmit a movement command for moving to the workpiece pick-up position P' to the machine 10, and tracks the specified number of four workpieces W. When the machine 10 reaches the specified number of four workpieces W, the control unit 29 transmits, to the machine 10, an extending/retracting command for extending/retracting the hand 12 and a pick-up command for picking up the specified number of four workpieces W.

The example in which the specified number of workpieces W are collectively taken out to the workpiece container T being conveyed is the same as that in Example 3-1 and Example 3-2, and thus the description thereof will be omitted.

As described above, according to the mechanical system 1 of the third embodiment, even when the conveyance information is deleted because the workpiece W or the workpiece container T is defective, or even when the workpiece W or the workpiece container T is supplied in the toothless state in which the workpiece W or the workpiece container T is missing from the row of workpieces W or the workpiece containers T, the hand 12 can be extended and retracted based on the conveyance information of the workpiece W determined to be picked up or the conveyance information of the workpiece container T determined that taking out thereto is possible, and the specified number of four workpieces W can be picked up or taken out without omission. In addition, since one piece of conveyance information of the workpiece W is generated for one workpiece W or one piece of conveyance information of the workpiece container T is generated for one workpiece container T, and the hand 12 extends and retracts, the machine 10 can pick up or take out, to the extent possible, the workpiece W that can be picked up or the workpiece container T to which the workpiece W can be taken out, across the workpiece W or the workpiece container T corresponding to the deleted conveyance information or across the workpiece W or the workpiece container T missing from the row of workpieces W or the workpiece containers T.

Figure 13:
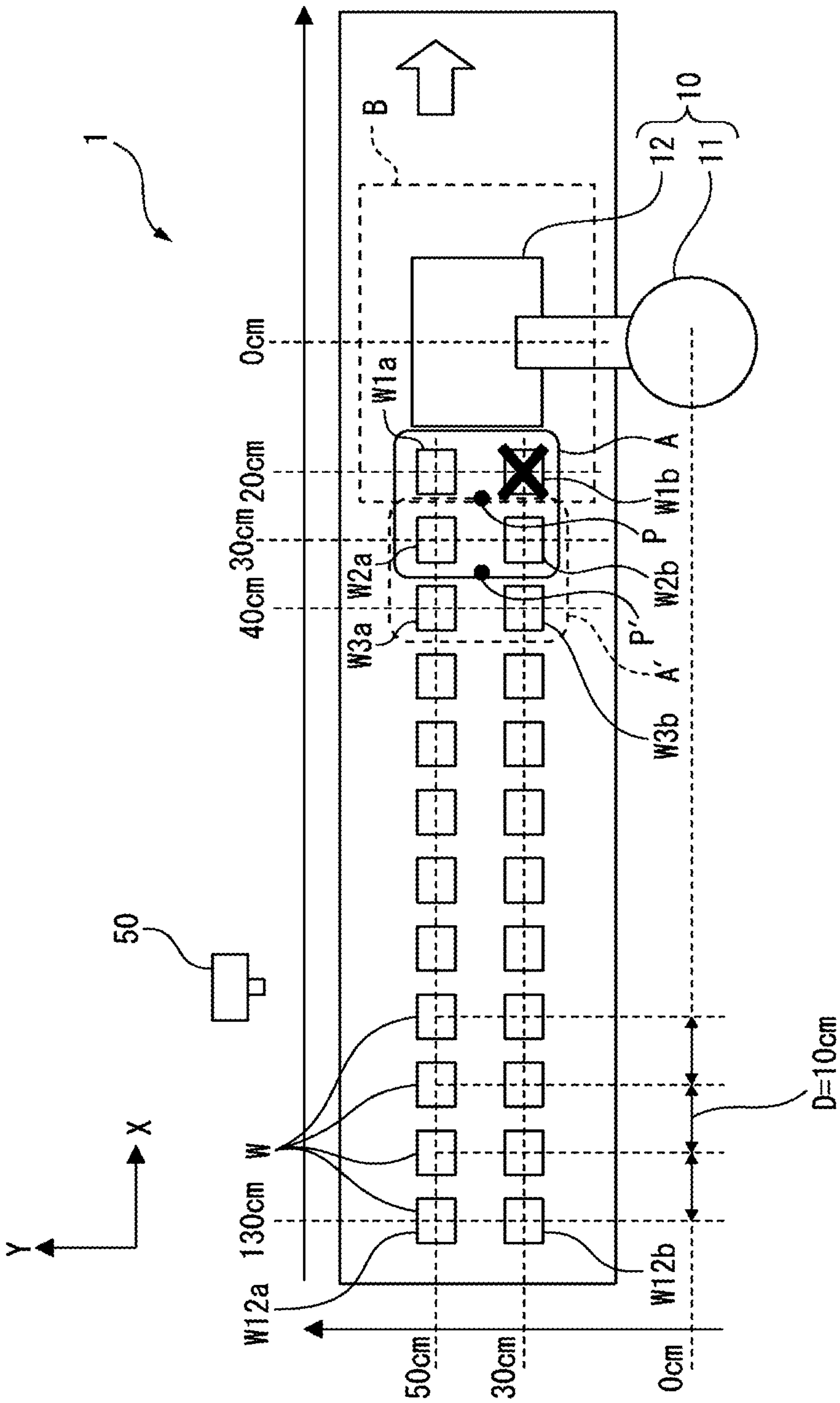
FIG. 13 is a diagram illustrating Example 4-1 of a mechanical system according to a fourth embodiment.

FIG. 13 is a diagram illustrating Example 4-1 of a mechanical system of a fourth embodiment. Hereinafter, only a part different from the mechanical system 1 of the first embodiment or the second embodiment will be described, and description of the same configuration and the same operation as those of the mechanical system 1 of the first embodiment or the second embodiment will be omitted. The mechanical system 1 of the fourth embodiment collectively picks up a specified number of workpieces W over a plurality of rows from among the workpieces W conveyed in the plurality of rows, or collectively takes out a specified number of workpieces W over a plurality of rows to the workpiece container T conveyed in the plurality of rows.

The example will be described also with reference to FIG. 2. The prerequisites for the example are as follows.

One type or a plurality of types of workpieces W are conveyed in two rows at the conveyance interval D=10 cm.

The specified number setting unit 26 sets the specified number of workpieces W to be collectively picked up by the machine 10 to four.

The machine 10 picks up the workpiece W in a work area B±25 cm at the X coordinate of the machine coordinate system.

The hand 12 is configured to collectively pick up one to four workpieces W in a plurality of rows.

The conveyance information generation unit 21 generates one piece of conveyance information (W1*a* to W12*a*, W1*b* to W12*b*) for one workpiece W. Furthermore, the conveyance information generation unit 21 generates conveyance information (W1*a* to W12*a*, W1*b* to W12*b*) of the workpiece W for each row.

The storage part 24 stores the conveyance information W1*a* to W12*a* and W1*b* to W12*b* in the order of conveyance of the workpiece W for each row.

The current positions of the workpieces W included in the conveyance information W1*a* to W12*a* are 20 cm:50 cm, 30 cm:50 cm, 40 cm:50 cm, . . . , and 130 cm:50 cm in the X coordinate:Y coordinate of the machine coordinate system, respectively, and the current positions of the workpieces W included in the conveyance information W1*b* to W12*b* are 20 cm:30 cm, 30 cm:30 cm, 40 cm:30 cm, . . . , and 130 cm:30 cm in the X coordinate:Y coordinate of the machine coordinate system, respectively.

The threshold value setting unit 28 sets the threshold value of the distance between the current positions included in the conveyance information of the workpieces W adjacent in the conveyance direction X to ±13 cm (=conveyance interval 10 cm±offset 3 cm), and sets the threshold value of the distance between the current positions included in the conveyance information of the workpieces W adjacent in the column direction Y to ±23 cm (=column interval 20 cm±offset 3 cm).

The status of the workpiece W included in the conveyance information W1*b* indicates that the workpiece W cannot be picked up (indicated by an "x" mark), depending on the work performance of the machine 10 or the type of workpiece W that can be picked up by the machine 10.

The conveyance information acquisition unit 25 sequentially acquires a specified number of four pieces of conveyance information W1*a*, W2*a*, W1*b*, and W2*b* from the storage part 24, and sequentially transmits the conveyance information to the decision unit 27. The decision unit 27 sequentially determines whether or not the workpiece W can be picked up based on the status of the workpiece W included in each of the conveyance information W1*a*, W2*a*, W1*b*, and W2*b*. Since the status of the workpiece W included in the conveyance information W1*b* indicates that the workpiece W cannot be picked up (indicated by an "x" mark), the determination unit 27*b* determines that the workpiece W corresponding to the conveyance information W1*b* cannot be picked up. The decision unit 27 transmits, to the conveyance information acquisition unit 25, the determination that the workpiece W corresponding to the conveyance information W1*b* cannot be picked up.

The conveyance information acquisition unit 25 again sequentially acquires the conveyance information W2*a*, W3*a*, W2*b*, and W3*b* of the specified number of four workpieces W located upstream of the workpiece W (indicated by the "x" mark) determined not to be picked up from the storage part 24, and sequentially transmits the conveyance information to the decision unit 27. The decision unit 27 sequentially determines whether or not the workpiece W can be picked up based on the status of the workpiece W included in each of the conveyance information W2*a*, W3*a*, W2*b*, and W3*b*. Since all the statuses included in the conveyance information W2*a*, W3*a*, W2*b*, and W3*b* indicate that the workpieces W can be picked up, the determination unit 27*b* determines that all the workpieces W corresponding to the conveyance information W2*a*, W3*a*, W2*b*, and W3*b* can be picked up. The decision unit 27 sequentially transmits, to the conveyance information acquisition unit 25, the determination that the workpieces W corresponding to the conveyance information W2*a*, W3*a*, W2*b*, and W3*b* can be picked up. Since the specified number of four pieces of conveyance information W2*a*, W3*a*, W2*b*, and W3*b* of the workpieces W determined to be picked up have been acquired from the storage part 24, the conveyance information acquisition unit 25 transmits the conveyance information W2*a*, W3*a*, W2*b*, and W3*b* to the control unit 29.

The control unit 29 calculates a workpiece pick-up position P' (35 cm:40 cm) based on the current position (30 cm:50 cm, 40 cm:50 cm, 30 cm:30 cm, and 40 cm:30 cm) of the workpieces W included in the conveyance information W2*a*, W3*a*, W2*b*, and W3*b*. In other words, the original workpiece pick-up position P (25 cm:40 cm) is corrected to the workpiece pick-up position P' (35 cm:40 cm) based on the current positions of the workpieces W included in each of the conveyance information W2*a*, W3*a*, W2*b*, and W3*b* of the specified number of four workpieces W located upstream of the workpiece W (indicated by the "x" mark) determined not to be picked up. Stated otherwise, the original workpiece pick-up area A is corrected to the workpiece pick-up area A' by the conveyance information W2*a*, W3*a*, W2*b*, and W3*b* of the specified number of four workpieces W located upstream of the workpiece W (indicated by the "x" mark) determined not to be picked up.

The control unit 29 continues to calculate the workpiece pick-up position P' based on the current positions of the workpieces W included in the conveyance information W2*a*, W3*a*, W2*b*, and W3*b* until the specified number of four workpieces W are picked up. When the workpiece pick-up position P' enters the work area B (±25 cm) of the machine 10, the control unit 29 continues to transmit a movement command for moving to the workpiece pick-up position P' to the machine 10, and tracks the specified number of four workpieces W. When the machine 10 reaches the specified number of four workpieces W, the control unit 29 transmits, to the machine 10, a pick-up command for picking up the specified number of four workpieces W.

As described above, according to the mechanical system 1 of the fourth embodiment, even when the status of the workpiece W included in the conveyance information W1*b* indicates that the workpiece W cannot be picked up, the machine 10 can pick up the specified number of four workpieces based on the conveyance information W2*a*, W3*a*, W2*b*, and W3*b* of the workpieces W located upstream of the workpiece W (indicated by the "x" mark) determined not to be picked up, so that the specified number of four workpieces W can be picked up without omission. In addition, since the conveyance information generation unit 21 generates one piece of conveyance information for one workpiece W, the machine 10 can collectively pick up the specified number of four workpieces W from the workpiece W immediately after the workpiece W determined not to be picked up. In other words, the machine 10 can pick up, to the extent possible, the workpieces W that can be picked up.

Figure 14:
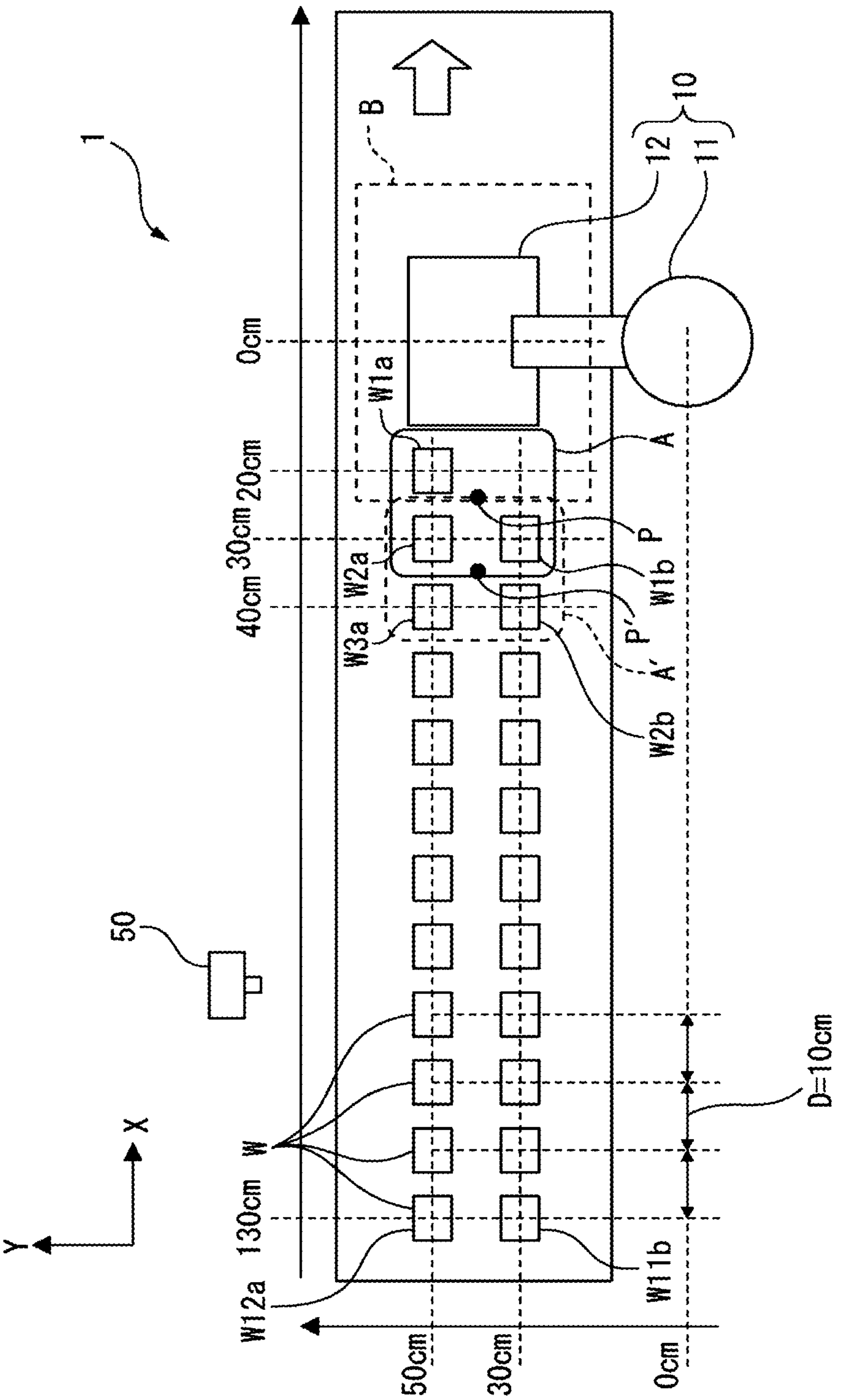
FIG. 14 is a diagram illustrating Example 4-2 of the mechanical system according to the fourth embodiment.

FIG. 14 is a diagram illustrating Example 4-2 of a mechanical system of a fourth embodiment. The example will be described also with reference to FIG. 2. The prerequisites for the example are as follows.

- One type or a plurality of types of workpieces W are conveyed in two rows at the conveyance interval D=10 cm.
- The specified number setting unit 26 sets the specified number of workpieces W to be collectively picked up by the machine 10 to four.
- The machine 10 picks up the workpiece W in a work area B±25 cm at the X coordinate of the machine coordinate system.
- The hand 12 is configured to collectively pick up one to four workpieces W in a plurality of rows.
- The conveyance information generation unit 21 generates one piece of conveyance information (W1*a* to W12*a*, W1*b* to W11*b*) for one workpiece W. Furthermore, the conveyance information generation unit 21 generates conveyance information (W1*a* to W12*a*, W1*b* to W11*b*) of the workpiece W for each column.
- The storage part 24 stores the conveyance information W1*a* to W12*a* and W1*b* to W11*b* in the order of conveyance of the workpiece W and for each row.
- The current positions of the workpieces W included in the conveyance information W1*a* to W12*a* are 20 cm:50 cm, 30 cm:50 cm, 40 cm:50 cm, . . . , and 130 cm:50 cm in the X coordinate:Y coordinate of the machine coordinate system, respectively, and the current positions of the workpieces W included in the conveyance information W1*b* to W11*b* are 30 cm:30 cm, 40 cm:30 cm, . . . , and 130 cm:30 cm in the X coordinate:Y coordinate of the machine coordinate system, respectively.
- The threshold value setting unit 28 sets the threshold value of the distance between the current positions included in the conveyance information of the workpieces W adjacent in the conveyance direction X to ±12 cm (=conveyance interval 10 cm±offset 2 cm), and sets the threshold value of the distance between the current positions included in the conveyance information of the workpieces W adjacent in the column direction Y to ±22 cm (=column interval 20 cm±offset 2 cm).
- One workpiece W located most downstream is defective, and thus the conveyance information is deleted, or the workpiece W is conveyed in a toothless state in which the workpiece W is missing from the row of workpieces W.

The conveyance information acquisition unit 25 sequentially acquires the conveyance information W1*a*, W2*a*, W1*b*, and W2*b* specified number of four pieces of conveyance information from the storage part 24, and sequentially transmits the conveyance information to the decision unit 27. The decision unit 27 sequentially determines whether or not the workpiece W can be picked up, based on the distances between the current positions included in the conveyance information W1*a* and W2*a* of the workpieces W adjacent in the conveyance direction X and the conveyance information W1*b* and W2*b* of the workpieces W adjacent in the conveyance direction X, and also based on the distances between the current positions included in the conveyance information W1*a* and W1*b* of the workpieces W adjacent in the column direction Y and the conveyance information W2*a* and W2*b* of the workpieces W adjacent in the column direction Y. The distance calculation unit 27*a* calculates distances (10 cm and 10 cm) between current positions (20 cm and 30 cm, and 30 cm and 40 cm) respectively included in the conveyance information W1*a* and W2*a* of the workpieces W adjacent to each other in the conveyance direction X and the conveyance information W1*b* and W2*b* of the workpieces W adjacent to each other in the conveyance direction X, and the determination unit 27*b* determines that the calculated distances (10 cm and 10 cm) between the current positions are all within a threshold value (±12 cm), but since the distance (22.4 cm) between the current positions included in the conveyance information W1*a* and W1*b* of the workpieces W adjacent in the column direction Y is not within the threshold value (±22), the determination unit 27*b* determines that the workpiece W located downstream of the workpieces W adjacent in the column direction Y cannot be picked up. The decision unit 27 transmits, to the conveyance information acquisition unit 25, the determination that the workpiece W corresponding to the conveyance information W1*a* cannot be picked up.

The conveyance information acquisition unit 25 again sequentially acquires the conveyance information W2*a*, W3*a*, W1*b*, and W2*b* of the specified number of four workpieces W located upstream of the workpiece W (indicated by an "x" mark) determined not to be picked up from the storage part 24, and sequentially transmits the conveyance information to the decision unit 27. The decision unit 27 sequentially determines whether or not the workpiece W can be picked up, based on the distances between the current positions included in the conveyance information W2*a* and W3*a* of the workpieces W adjacent in the conveyance direction X and the conveyance information W1*b* and W2*b* of the workpieces W adjacent in the conveyance direction X, and based on the distances between the current positions included in the conveyance information W2*a* and W1*b* of the workpieces W adjacent in the column direction Y and the conveyance information W3*a* and W2*b* of the workpieces W adjacent in the column direction Y. The distance calculation unit 27*a* sequentially calculates distances between current positions respectively included in the conveyance information W2*a* and W3*a* of the workpieces W adjacent in the conveyance direction X and the conveyance information W1*b* and W2*b* of the workpieces W adjacent in the conveyance direction X, and distances between current positions respectively included in the conveyance information W2*a* and W1*b* of the workpieces W adjacent in the column direction Y and the conveyance information W3*a* and W2*b* of the workpieces W adjacent in the column direction Y. The determination unit 27*b* sequentially receives the calculated distances (10 cm, 10 cm, 20 cm, 20 cm) between the current positions and determines whether or not the distances are not within the threshold value (conveyance direction X±12 cm, column direction Y±22 cm), but since the distances (10 cm, 10 cm, 20 cm, 20 cm) between all the current positions are within the threshold value (conveyance direction X±12 cm, column direction Y±22 cm), the determination unit 27*b* determines that all the workpieces W corresponding to the conveyance information W2*a*, W3*a*, W1*b*, and W2*b* can be picked up. The decision unit 27 sequentially transmits, to the conveyance information acquisition unit 25, the determination that the workpieces W corresponding to the conveyance information W2*a*, W3*a*, W1*b*, and W2*b* can be picked up. Since the conveyance information acquisition unit 25 can acquire the specified number of four pieces of conveyance information W2*a*, W3*a*, W1*b*, and W2*b* from the storage part 24, the conveyance information acquisition unit transmits the conveyance information W2*a*, W3*a*, W1*b*, and W2*b* to the control unit 29.

The control unit 29 calculates a workpiece pick-up position P' (35 cm:40 cm) based on the current position (30 cm, 50 cm, 40 cm, 50 cm, 30 cm, 30 cm, and 40 cm, 30 cm) of the workpieces W included in the conveyance information W2*a*, W3*a*, W1*b*, and W2*b*. In other words, the original workpiece pick-up position P (25 cm:40 cm) is corrected to the workpiece pick-up position P' (35 cm:40 cm) based on the current positions respectively included in the conveyance information W2*a*, W3*a*, W1*b*, and W2*b* of the specified number of four workpieces W located upstream of the workpiece W determined not to be picked up. Stated otherwise, the original workpiece pick-up area A is corrected to the workpiece pick-up area A' by the conveyance information W2*a*, W3*a*, W1*b*, and W2*b* of the specified number of four workpieces W located upstream of the workpiece W determined not to be picked up.

The control unit 29 continues to calculate the workpiece pick-up position P' based on the current positions of the workpieces W included in the conveyance information W2*a*, W3*a*, W1*b*, and W2*b* until the specified number of four workpieces W are picked up. When the workpiece pick-up position P' enters the work area B (±25 cm) of the machine 10, the control unit 29 continues to transmit a movement command for moving to the workpiece pick-up position P' to the machine 10, and tracks the specified number of four workpieces W. When the machine 10 reaches the specified number of four workpieces W, the control unit 29 transmits, to the machine 10, a pick-up command for picking up the specified number of four workpieces W.

The example in which the specified number of workpieces W are collectively taken out to the workpiece container T being conveyed is the same as that in Example 4-1 and Example 4-2, and thus the description thereof will be omitted.

As described above, according to the mechanical system 1 of the fourth embodiment, even when the conveyance information is deleted because the workpiece W or the workpiece container T is defective, or even when the workpiece W or the workpiece container T is supplied in a toothless state in which the workpiece W or the workpiece container T is missing from a plurality of rows of workpieces W or workpiece containers T, the machine 10 can pick up or take out, to the workpiece container T, the specified number of four workpieces W located upstream of the workpiece W or the workpiece container T determined not to be picked up or taken out, and thus the specified number of four workpieces W can be picked up without omission or taken out to the workpiece container T without omission. In addition, since one piece of conveyance information of the workpiece W or the workpiece container T is generated for one workpiece W or workpiece container T, the machine 10 can collectively pick up or collectively take out, to the workpiece container T, a specified number of workpieces W from among the workpieces W or the workpiece containers T immediately after the workpiece W or the workpiece container T determined not to be picked up or not to be taken out. In other words, the machine 10 can pick up the workpieces W that can be picked up, to the extent possible, or can take out the workpieces W to the workpiece container T to which the workpieces W can be taken out, to the extent possible.

Figure 15:
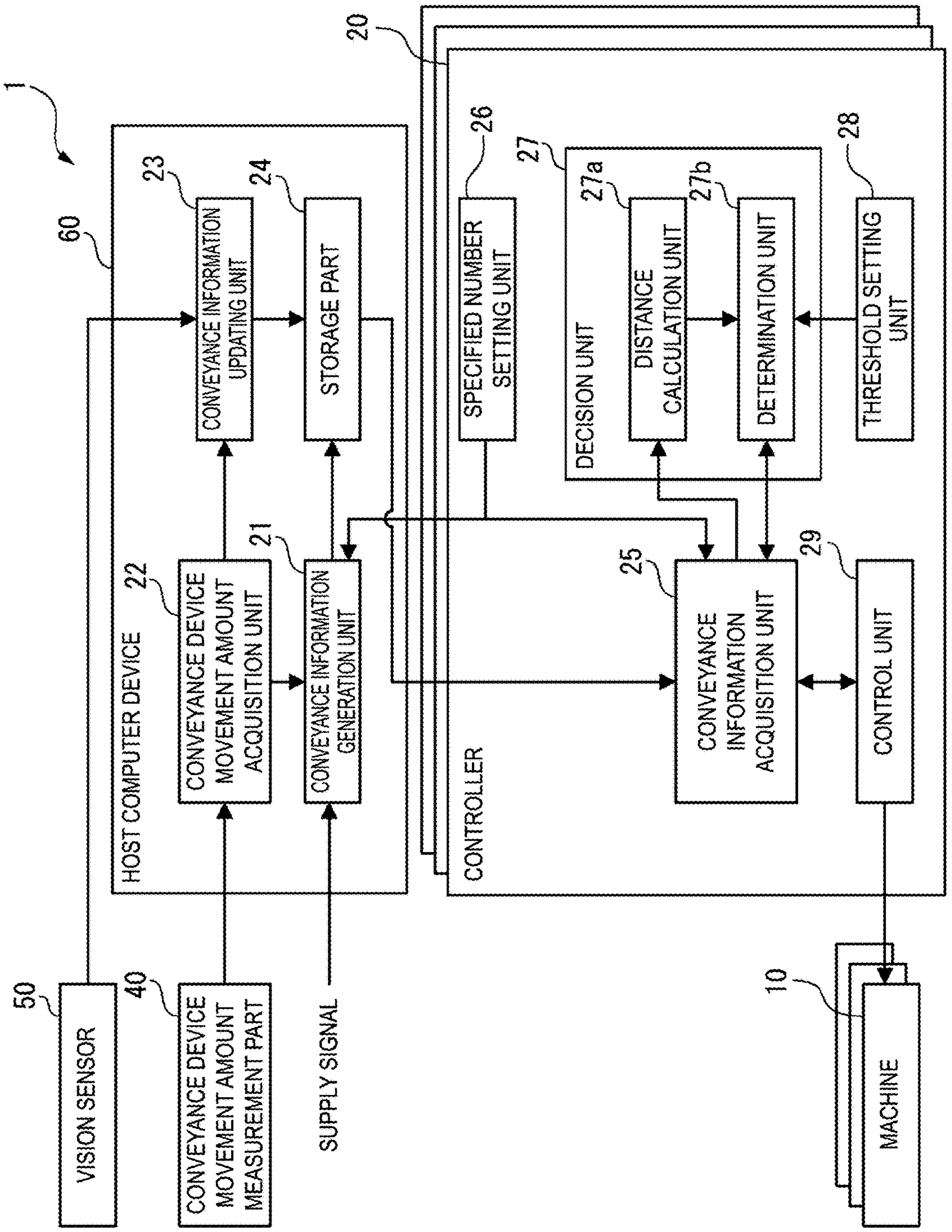
FIG. 15 is a functional block diagram of a mechanical system according to a fifth embodiment.

FIG. 15 is a functional block diagram of a mechanical system 1 of a fifth embodiment. Hereinafter, only a part different from the mechanical system 1 of the first embodiment or the second embodiment will be described, and description of the same configuration and the same operation as those of the mechanical system 1 of the first embodiment or the second embodiment will be omitted. The mechanical system 1 of the fifth embodiment is a server type system including a plurality of machines 10, a plurality of controllers 20, and one host computer device 60. The mechanical system 1 updates the status of the workpiece W or the workpiece container T included in the conveyance information for each machine 10 based on the work performance of the machine 10, the type of the workpiece W that can be picked up by the machine 10, or the type of the workpiece container T to which the workpiece can be taken out by the machine 10. In addition, the mechanical system 1 determines, for each machine 10, whether or not the workpiece W being conveyed is picked up or is taken out to the workpiece container T being conveyed, based on the status of the workpiece W or the workpiece container T included in the conveyance information, and collectively picks up or collectively takes out a specified number of workpieces W for each machine 10, based on the determination whether or not the workpiece W is picked up or is taken out. The plurality of machines 10 collectively pick up a specified number of workpieces W. The plurality of controllers 20 control each of the plurality of machines 10.

The host computer device 60 manages conveyance information of the workpiece W being conveyed or conveyance information of the workpiece container T being conveyed. The host computer device 60 generates the conveyance information of the workpiece W being conveyed or the conveyance information of the workpiece container T being conveyed, and updates the current position, the current speed, the current orientation, the type, the status, and the like of the workpiece W based on the movement amount of the conveyance device 30 acquired from the conveyance device movement amount measurement part 40 or based on the visual information acquired from the vision sensor 50.

The host computer device 60 updates the status of the workpiece W or the workpiece container T included in the conveyance information for each machine 10 based on the work performance of the machine 10, the type of the workpiece W that can be picked up by the machine 10, or the type of workpiece container T to which the workpiece can be taken out by the machine 10. The host computer device 60 is communicably connected to the plurality of controllers 20, the conveyance device movement amount measurement part 40, the vision sensor 50, and the like in a wired or wireless manner.

The host computer device 60 is a computer device (not illustrated) including a processor, a memory, an input/output part, and the like. The processor includes a semiconductor integrated circuit that executes a program, for example, a central processing unit (CPU), a micro processing unit (MPU), or the like. However, in other embodiments, the processor includes a programmable semiconductor integrated circuit, for example, a programmable logic device (PLD) such as a field programmable gate array (FPGA), or a non-programmable semiconductor integrated circuit, for example, an application specific integrated circuit (ASIC). The memory includes a semiconductor storage device that stores various data, for example, a random access memory (RAM), a read only memory (ROM), or the like. In other embodiments, the memory may include a magnetic storage device, such as an HDD, for storing various data.

The controller 20 determines whether or not the workpiece W can be picked up or whether or not the workpiece W can be taken out to the workpiece container T for each machine 10 based on the status or the current position included in the conveyance information of the workpiece W or the workpiece container T. The controller 20 determines that the workpiece W can be picked up or the workpiece can be taken out to the workpiece container T when the status included in the conveyance information of the workpiece W or the workpiece container T indicates that the workpiece W can be picked up or can be taken out, and determines that the workpiece W cannot be picked up or cannot be taken out to the workpiece container T when the status included in the conveyance information of the workpiece W indicates that the workpiece W cannot be picked up or cannot be taken out.

The controller 20 determines that the workpiece W can be picked up or determines that the workpiece container T can be taken out when the distance between the current positions included in the conveyance information of the workpiece W or the workpiece container T is within the threshold value, and determines that the workpiece W cannot be picked up or determines that the workpiece W cannot be taken out to the workpiece container T when the distance between the current positions included in the conveyance information of the workpiece W is not within the threshold value.

The controller 20 generates, for each machine 10, a command for collectively picking up the specified number of workpieces W or a command for collectively taking out the specified number of workpieces W, based on the conveyance information of the workpieces W or the workpiece containers T located upstream of the workpiece W determined not to be picked up or the workpiece container T determined to which the workpiece container T cannot be taken out, and controls the machine 10. The machine 10 collectively picks up or collectively takes out a specified number of workpieces W in response to a command from the controller 20. The controller 20 is communicably connected to the machine 10, the host computer device 60, and the like in a wired or wireless manner.

The host computer device 60 includes a conveyance information generation unit 21, a conveyance device movement amount acquisition unit 22, a conveyance information updating unit 23, and a storage part 24. The controller 20 includes a conveyance information acquisition unit 25, a specified number setting unit 26, a decision unit 27, a threshold value setting unit 28, and a control unit 29. The constituent elements other than the storage part 24 are configured by a part of or all of the computer program. In other embodiments, all the constituent elements in the host computer device 60 and the controller 20 may be configured by a part or all of a semiconductor integrated circuit.

For example, based on the work performance of the first type machine 10 and the work performance of the second type machine 10, the host computer device 60 may update the status included in the conveyance information of a specific workpiece W to "only picked up by the first type machine 10", and may update the status included in the conveyance information of a different workpiece W to "only picked up by the second type machine 10". When a plurality of types of workpieces W are conveyed, the type A workpiece W that can be picked up by the first type machine 10 can be picked up, and the second type machine 10 can pick up the type B workpiece W, the host computer device 60 may update the status included in the conveyance information of the type A workpiece W to "only picked up by the first type machine 10", and may update the status included in the conveyance information of the type B workpiece W to "only picked up by the second type machine 10". When the workpiece W is picked up by the plurality of machines 10, the workpiece W may be conveyed in a toothless state in which the workpiece W is missing from the row of workpieces W. The controller 20 determines whether or not the workpiece W being conveyed can be picked up based on the status included in the conveyance information of the workpiece W or the distance between the current positions included in the conveyance information of the adjacent workpieces W, and generates a command for collectively picking up the specified number of workpieces W for each machine 10 based on whether or not the workpiece W is picked up.

As described above, according to the mechanical system 1 of the fifth embodiment, even when the status of the workpiece W or the workpiece container T included in the conveyance information indicates that the workpiece W or the workpiece container T cannot be picked up for each machine 10 depending on the work performance of the plurality of machines 10 or the type of workpiece W that can be picked up by the machine 10 or the type of the workpiece container T, and even when the workpieces W or the workpiece containers T are conveyed in the toothless state by the plurality of machines 10 picking up the workpiece W, the controller 20 determines whether or not the workpiece W can be picked up or whether or not the workpiece W can be taken out to the workpiece container T for each machine based on the status or the current position of the workpiece W or the workpiece container T included in the conveyance information, so that the machine 10 can collectively pick up or collectively take out the specified number of workpieces W.

The above-described computer program may be provided by being recorded in a computer-readable non-transitory recording medium, for example, a CD-ROM or the like, or may be provided by being distributed from a server device on a wide area network (WAN) or a local area network (LAN) in a wired or wireless manner.

Although various embodiments have been described in this specification, the present invention is not limited to the above-described embodiments, and it is to be understood that various changes can be made without departing from the scope of the appended claims.

The invention claimed is:

1. A controller, comprising:

a decision unit configured to determine whether or not workpieces arranged and conveyed in one or more rows are picked up, or whether or not workpieces arranged and conveyed in one or more rows are taken out to workpiece containers arranged and conveyed in one or more rows; and a control unit configured to control a machine by generating, based on a determination result of whether or not the workpieces are picked up, a command for collectively picking up, in a single operation of the machine in a state in which the workpieces are arranged in a row, a predetermined number of the workpieces, or by generating, based on a determination result of whether or not the workpieces are taken out, a command for collectively taking out, in a single operation of the machine in a state in which the workpieces are arranged in a row, a predetermined number of the workpieces to the workpiece containers, wherein a status indicating whether or not the workpieces are picked up or taken out is predetermined, and the decision unit is configured to determine whether or not the workpieces are picked up based on the status included in conveyance information of the workpieces, or whether or not the workpieces are taken out to the workpiece containers based on the status included in conveyance information of the workpiece containers.

2. The controller according to claim 1, wherein the control unit is configured to generate, based on conveyance information of a workpiece located upstream of a workpiece determined not to be picked up, a command for collectively picking up the predetermined number of the workpieces, or generate a command for collectively taking out the predetermined number of the workpieces, based on conveyance information of a workpiece container located upstream of a workpiece container to which it is determined that the workpiece is not taken out.

3. The controller according to claim 1, further comprising a threshold value setting unit configured to set a threshold value of a distance between current positions included in the conveyance information of the workpieces adjacent to each other or the workpiece containers adjacent to each other.

4. The controller according to claim 1, further comprising a specified number setting unit configured to set the predetermined number of the workpieces being collectively picked up or collectively taken out.

5. The controller according to claim 1, further comprising a conveyance information generation unit configured to generate, for one workpiece or one workpiece container, one piece of conveyance information including a current position or a status of the one workpiece or the one workpiece container.

6. The controller according to claim 1, further comprising a conveyance information generation unit configured to generate, for the predetermined number of the workpieces or the predetermined number of the workpiece containers, one piece of conveyance information including a current position or a status of a group of the predetermined number of workpieces or a group of the predetermined number of workpiece containers.

7. The controller according to claim 1, further comprising a storage part configured to store the conveyance information including a current position or the status of the workpieces or the conveyance information including a current position or the status of the workpiece containers, in an order of conveyance of the workpieces or the workpiece containers.

8. The controller according to claim 1, further comprising a conveyance information updating unit configured to update, based on a movement amount of a conveyance device that conveys the workpieces or the workpiece containers, the conveyance information including a current position of the workpieces or the conveyance information including a current position of the workpiece containers.

9. The controller according to claim 1, further comprising a conveyance information updating unit configured to update, based on (i) a work performance of the machine, or (ii) a type of each workpiece or a type of each workpiece container, which is picked up by the machine, the conveyance information including the status of the workpieces or the conveyance information including the status of the workpiece containers.

10. The controller according to claim 1, wherein the decision unit includes:

a distance calculation unit configured to calculate a distance between current positions included in conveyance information of the workpieces adjacent to each other or a workpiece group adjacent to each other, or a distance between current positions included in conveyance information of the workpiece containers adjacent to each other or a workpiece container group adjacent to each other; and a determination unit configured to determine whether or not the workpieces are picked up or whether or not the workpieces are taken out to the workpiece containers, based on the calculated distance.

11. The controller according to claim 1, wherein the control unit is configured to generate a command for taking out one workpiece to one workpiece container, or a command for taking out the predetermined number of workpieces to one workpiece container.

12. The controller according to claim 1, wherein the machine includes an extendable hand, and the control unit is configured to generate a command for extending or retracting the extendable hand, based on a current position included in the conveyance information of the workpieces determined to be picked up or a current position included in the conveyance information of the workpiece containers to which it is determined that the workpieces are taken out.

13. A mechanical system, comprising:

a plurality of machines; and a decision unit configured to determine, for each of the plurality of machines, whether or not workpieces arranged and conveyed in one or more rows are picked up or whether workpieces are taken out to a workpiece container arranged and conveyed in one or more rows; and a control unit configured to control the machine by generating, based on a determination result of whether or not the workpieces are picked up, for each of the plurality of machines, a command for collectively picking up, in a single operation of the machine in a state in which the workpieces are arranged in a row, a predetermined number of the workpieces, or by generating, based on a determination result of whether or not the workpieces are taken out, a command for collectively taking out, in a single operation of the machine in a state in which the workpieces are arranged in a row, the predetermined number of the workpieces, to the workpiece containers, wherein a status indicating whether or not the workpieces are picked up or taken out is predetermined, and the decision unit is configured to determine whether or not the workpieces are picked up based on the status included in conveyance information of the workpieces, or whether or not the workpieces are taken out to the workpiece containers based on the status included in conveyance information of the workpiece containers.

* * * * *